(12) United States Patent
Mochizuki

(10) Patent No.: US 12,208,638 B2
(45) Date of Patent: Jan. 28, 2025

(54) THREE-DIMENSIONAL OBJECT PRINTING APPARATUS AND THREE-DIMENSIONAL OBJECT PRINTING METHOD

(71) Applicant: SEIKO EPSON CORPORATION, Tokyo (JP)

(72) Inventor: Kenju Mochizuki, Azumino (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/661,101

(22) Filed: Apr. 28, 2022

(65) Prior Publication Data

US 2022/0347918 A1 Nov. 3, 2022

(30) Foreign Application Priority Data

Apr. 30, 2021 (JP) ................. 2021-077275

(51) Int. Cl.
| | |
|---|---|
| *B41J 3/407* | (2006.01) |
| *B25J 11/00* | (2006.01) |
| *B25J 18/00* | (2006.01) |
| *B41M 5/00* | (2006.01) |

(52) U.S. Cl.
CPC ........ *B41M 5/0088* (2013.01); *B25J 11/0075* (2013.01); *B25J 18/00* (2013.01); *B41J 3/4073* (2013.01)

(58) Field of Classification Search
CPC ................. B41J 3/407; B41J 3/4078
See application file for complete search history.

(56) References Cited

U.S. PATENT DOCUMENTS

| | | | |
|---|---|---|---|
| 2004/0206735 A1 | 10/2004 | Okuda et al. | |
| 2009/0167817 A1* | 7/2009 | Orr | B29C 64/106 347/37 |
| 2014/0063096 A1 | 3/2014 | Pitz et al. | |
| 2018/0201029 A1* | 7/2018 | Mathis | B41J 2/01 |
| 2018/0333848 A1 | 11/2018 | Igarashi | |
| 2022/0161562 A1 | 5/2022 | Murai et al. | |

FOREIGN PATENT DOCUMENTS

| | | |
|---|---|---|
| JP | 2004-314137 | 11/2004 |
| JP | 2014-50832 A | 3/2014 |
| JP | 2018-030099 | 3/2018 |
| JP | 2018-192551 | 12/2018 |
| JP | 2020-168786 | 10/2020 |
| JP | 2021-058868 | 4/2021 |

* cited by examiner

*Primary Examiner* — Scott A Richmond
(74) *Attorney, Agent, or Firm* — WORKMAN NYDEGGER

(57) ABSTRACT

A three-dimensional object printing apparatus includes a head that discharges a liquid to a three-dimensional workpiece, and a robot that includes an arm and a base portion coupled to one end of the arm, and changes relative positions of the workpiece and the head. The arm includes a plurality of joints and a tip portion that is the other end of the arm and supports the head, a first printing operation in which the robot moves a position of the head while the liquid is discharged from the head is executed, and the head moves away from the base portion during the execution of the first printing operation.

12 Claims, 11 Drawing Sheets

THREE-DIMENSIONAL OBJECT PRINTING APPARATUS AND THREE-DIMENSIONAL OBJECT PRINTING METHOD

The present application is based on, and claims priority from JP Application Serial Number 2021-077275, filed Apr. 30, 2021, the disclosure of which is hereby incorporated by reference herein in its entirety.

BACKGROUND

1. Technical Field

The present disclosure relates to a three-dimensional object printing apparatus and a three-dimensional object printing method.

2. Related Art

A three-dimensional object printing apparatus that performs printing on a surface of a three-dimensional workpiece by an ink jet method has been known. For example, JP-A-2014-050832 discloses a three-dimensional object printing apparatus that includes a head that discharges a liquid such as ink to a workpiece and a robot that changes relative positions of the workpiece and the head. The robot includes an arm and a base portion coupled to one end of the arm. The arm includes a plurality of joints and a tip portion that is the other end of the arm and supports the head.

However, in the above-mentioned related art, there is a concern that vibration is caused in a joint due to the movement of the head during execution of printing and printing quality deteriorates.

SUMMARY

According to an aspect of the present disclosure, there is provided a three-dimensional object printing apparatus including a head that discharges a liquid to a three-dimensional workpiece, and a robot that includes an arm and a base portion coupled to one end of the arm, and changes relative positions of the workpiece and the head. The arm includes a plurality of joints and a tip portion that is the other end of the arm and supports the head, a first printing operation in which the robot moves a position of the head while the liquid is discharged from the head is executed, and the head moves away from the base portion during the execution of the first printing operation.

According to another aspect of the present disclosure, there is provided a three-dimensional object printing apparatus including a head that discharges a liquid to a three-dimensional workpiece, and a robot that includes an arm and a base portion coupled to one end of the arm, and changes relative positions of the workpiece and the head. The arm includes a plurality of joints and a tip portion that is the other end of the arm and supports the head, a printing operation in which the robot moves a position of the head while the liquid is discharged from the head is executed, the plurality of joints include a first joint, a second joint, and a third joint, the second joint is closer to the base portion than the first joint, the third joint is closer to the tip portion than the first joint, the first joint rotates around a first rotation axis, the second joint rotates around a second rotation axis, the third joint rotates around a third rotation axis, the robot is configured to set the first rotation axis, the second rotation axis, and the third rotation axis to be parallel to each other, and when a line segment connecting the second joint and the first joint is a first virtual line segment, a line segment connecting the first joint and the third joint is a second virtual line segment, and an angle formed by the first virtual line segment and the second virtual line segment is a first angle, the first angle at a point in time at which the head starts discharging the liquid in the printing operation is less than or equal to 140 degrees.

According to still another aspect of the present disclosure, there is provided a three-dimensional object printing method using a head that discharges a liquid to a three-dimensional workpiece, and a robot that includes an arm and a base portion coupled to one end of the arm, and changes relative positions of the workpiece and the head, the arm including a plurality of joints and a tip portion that is the other end of the arm and supports the head. The method includes executing a first printing operation in which the robot moves a position of the head while the liquid is discharged from the head. The head moves away from the base portion during the execution of the first printing operation.

According to still another aspect of the present disclosure, there is provided a three-dimensional object printing method using a head that discharges a liquid to a three-dimensional workpiece, and a robot that includes an arm and a base portion coupled to one end of the arm, and changes relative positions of the workpiece and the head, the arm including a plurality of joints and a tip portion that is the other end of the arm and supports the head. The method includes executing a printing operation in which the robot moves a position of the head while the liquid is discharged from the head. The plurality of joints include a first joint, a second joint, and a third joint, the second joint is closer to the base portion than the first joint, the third joint is closer to the tip portion than the first joint, the first joint rotates around a first rotation axis, the second joint rotates around a second rotation axis, the third joint rotates around a third rotation axis, the robot is configured to set the first rotation axis, the second rotation axis, and the third rotation axis to be parallel to each other, and when a line segment connecting the second joint and the first joint is a first virtual line segment, a line segment connecting the first joint and the third joint is a second virtual line segment, and an angle formed by the first virtual line segment and the second virtual line segment is a first angle, the first angle at a point in time at which the head starts discharging the liquid in the printing operation is less than or equal to 140 degrees.

DESCRIPTION OF EXEMPLARY EMBODIMENTS

Figure 1:
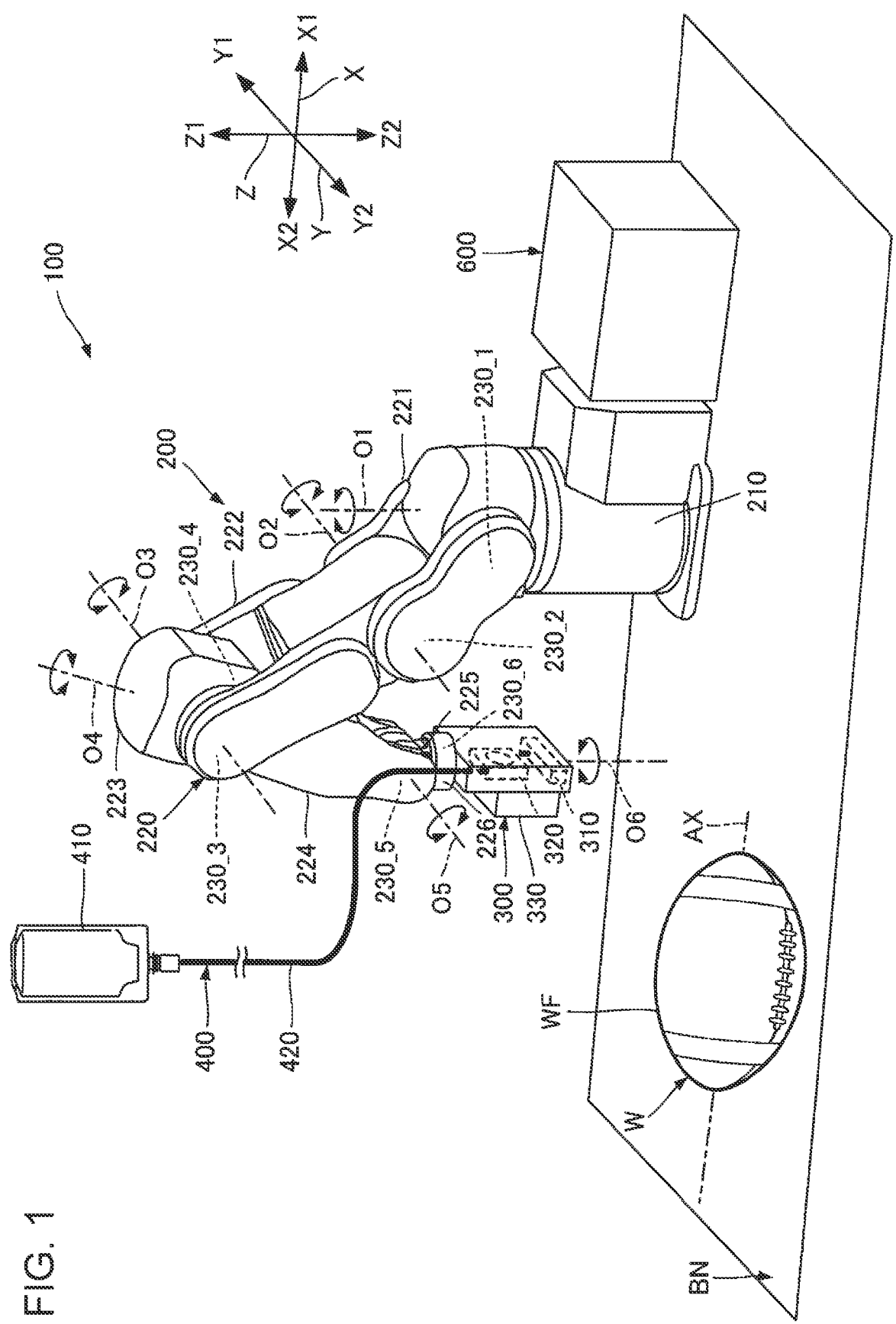
FIG. 1 is a perspective view illustrating an outline of a three-dimensional object printing apparatus 100 according to a first embodiment.

Hereinafter, preferred embodiments according to the present disclosure will be described with reference to the accompanying drawings. In the drawings, dimensions or scales of portions are appropriately different from the actual dimensions or scales, and some portions are schematically illustrated for easy understanding. The scope of the present disclosure is not limited to these forms unless otherwise particularly stated to limit the present disclosure in the following description.

The following description will be performed by using an X-axis, a Y-axis, and a Z-axis that intersect each other as appropriate. One direction along the X-axis is referred to as an X1 direction, and a direction opposite to the X1 direction is referred to as an X2 direction. Similarly, directions opposite to each other along the Y-axis are referred to as a Y1 direction and a Y2 direction. Directions opposite to each other along the Z-axis are referred to as a Z1 direction and a Z2 direction.

Here, the X-axis, the Y-axis, and the Z-axis are coordinate axes of a base coordinate system set in a space in which a workpiece W and a base portion 210 to be described later are installed. Typically, the Z-axis is a vertical axis, and the Z2 direction corresponds to a downward direction in a vertical direction. The Z-axis may not be a vertical axis. Although the X-axis, the Y-axis, and the Z-axis are typically orthogonal to each other, the present disclosure is not limited thereto, and the axes may not be orthogonal to each other. For example, the X-axis, Y-axis, and Z-axis may intersect each other at an angle within a range of 80° or more and 100° or less.

1. First Embodiment

1-1. Outline of Three-Dimensional Object Printing Apparatus

FIG. 1 is a perspective view illustrating an outline of a three-dimensional object printing apparatus 100 according to a first embodiment. The three-dimensional object printing apparatus 100 is an apparatus that prints on a surface of a three-dimensional workpiece W by an ink jet method.

The workpiece W has a surface WF to be printed. In the example illustrated in FIG. 1, the workpiece W is a rugby ball forming a long sphere around a long axis AX, and the surface WF is a curved surface having a non-constant curvature. In the present embodiment, the workpiece W is disposed such that the long axis AX is parallel to the X-axis. The workpiece W is not limited to the rugby ball. Here, an aspect of a shape or a size of the workpiece W is not limited to the example illustrated in FIG. 1, and is any aspect. For example, the surface of the workpiece W may have a surface such as a flat surface, a stepped surface, or an uneven surface. An installation pose of the workpiece W is not limited to the example illustrated in FIG. 1, and is any pose.

In the example illustrated in FIG. 1, the three-dimensional object printing apparatus 100 is an ink jet printer using a vertical articulated robot. Specifically, as illustrated in FIG. 1, the three-dimensional object printing apparatus 100 includes a robot 200, a liquid discharge unit 300, a liquid supply unit 400, and a controller 600. Hereinafter, first, each portion of the three-dimensional object printing apparatus 100 illustrated in FIG. 1 will be briefly described in sequence.

The robot 200 is a moving mechanism that changes a position and a pose of the liquid discharge unit 300 with respect to the workpiece W. In the example illustrated in FIG. 1, the robot 200 is a so-called 6-axis vertical articulated robot. Specifically, the robot 200 has the base portion 210 and an arm 220.

The base portion 210 is a base that supports the arm 220. In the example illustrated in FIG. 1, the base portion 210 is fixed to an installation surface BN such as a floor surface facing the Z1 direction by screwing or the like. The installation surface BN to which the base portion 210 is fixed is not limited to the example illustrated in FIG. 1, and may be, for example, a surface of a wall, a ceiling, a movable carriage, or the like.

The arm 220 is a 6-axis robot arm having a base end portion attached to the base portion 210 and a tip portion of which a position and a pose are three-dimensionally changed with respect to the base end portion. Specifically, the arm 220 has arm components 221, 222, 223, 224, 225, and 226, and these arm components are coupled in this order. The arm 220 has multiple joints, that is, a plurality of joints 230. In the example illustrated in FIG. 1, the number of joints 230 is six. The arm component 221 corresponds to the base end portion and also corresponds to "one end of the arm". The arm component 226 corresponds to the "tip portion".

The arm component 221 is rotatably coupled to the base portion 210 around a rotation axis O1 via a joint 230_1. The arm component 222 is rotatably coupled to the arm component 221 around a rotation axis O2 via a joint 230_2. The rotation means circular motion in both directions. The arm component 223 is rotatably coupled to the arm component 222 around a rotation axis O3 via a joint 230_3. The arm component 224 is rotatably coupled to the arm component 223 around a rotation axis O4 via a joint 230_4. The arm component 225 is rotatably coupled to the arm component 224 around a rotation axis O5 via a joint 230_5. The arm component 226 is rotatably coupled to the arm component 225 around a rotation axis O6 via a joint 230_6. Hereinafter, each of the joint 230_1 to the joint 230_6 may be referred to as the joint 230.

Each of the joint 230_1 to the joint 230_6 is a rotation joint that is rotatable around the rotation axis. The robot 200 according to the present embodiment has only the rotation joints, but may have one or more linear motion joints. When one arm component and another arm component are coupled to via the linear motion joint, one arm component moves along one axis with respect to the other arm component via the linear motion joint.

The arm component 222 and the arm component 223 are members extending in a direction perpendicular to the rotation axis O3. The extending direction of the arm component 222 changes depending on one or both of rotation angles of the joint 230_1 and the joint 230_2. The extending direction of the arm component 223 changes depending on one or more of rotation angles of the joint 230_1, the joint 230_2, and the joint 230_3.

Here, the arm component 223 is an example of a "first arm component". The arm component 222 is an example of a "second arm component". The joint 230_1 to the joint 230_6 are examples of a "plurality of joints". The joint 230_3 coupled to the arm component 223 and the arm component 222 is an example of a "first joint". The rotation axis O3 is an example of a "first rotation axis". The joint 230_2 is an example of a "second joint". The rotation axis O2 is an example of a "second rotation axis". The joint 230_5 is an example of a "third joint". The rotation axis O5 is an example of a "third rotation axis". The joint 230_1 is an example of a "fourth joint". The rotation axis O1 is an example of a "fourth rotation axis". The joint 230_2 is closer to the base portion 210 than the joint 230_3, and the joint 230_5 is closer to the arm component 226 than the joint 230_3. The fact that the joint 230_2 is closer to the base portion 210 than the joint 230_3 means that a length along the arm 220 from the joint 230_2 to the base portion 210 is shorter than a length along the arm 220 from the joint 230_3 to the base portion 210. Similarly, the fact that the joint 230_5 is closer to the arm component 226 than the joint 230_3 means that a length along the arm 220 from the joint 230_5 to the arm component 226 is shorter than a length along the arm 220 from the joint 230_3 to the arm component 226.

Each of the joint 230_1 to the joint 230_6 is a mechanism for rotatably coupling one of two adjacent arm components to the other arm component. Here, the rotation of joints 230 can be expressed as the movement of joints 230 in the present embodiment. Although not illustrated, a drive mechanism for rotating one of two adjacent arm components with respect to the other arm component is provided in each of the joint 230_1 to the joint 230_6. The drive mechanism includes, for example, a motor that generates a driving force for the rotation, a speed reducer that decelerates and outputs the driving force, and an encoder such as a rotary encoder that detects an operation amount such as an angle of the rotation or the like. An aggregate of the drive mechanisms corresponds to an arm drive mechanism 240 illustrated in FIG. 2 to be described later. The encoder corresponds to an encoder 241 illustrated in FIG. 2 and the like to be described later.

The rotation axis O1 is an axis perpendicular to the installation surface BN to which the base portion 210 is fixed. The rotation axis O2 is an axis perpendicular to the rotation axis O1. The rotation axis O3 is an axis parallel to the rotation axis O2. The rotation axis O4 is an axis perpendicular to the rotation axis O3. The rotation axis O5 is an axis perpendicular to the rotation axis O4. The rotation axis O6 is an axis perpendicular to the rotation axis O5.

As for these rotation axes, a case where one axis is "perpendicular" to the other axis includes a case where an angle formed by the two rotation axes is strictly 90 degrees and a case where the angle formed by the two rotation axes deviates within a range of about 90 degrees to ±5 degrees. Similarly, a case where one axis is "parallel" to the other axis includes a case where the two rotation axes are strictly parallel and a case where one of the two rotation axes tilts with respect to the other axis within a range of about ±5 degrees.

The liquid discharge unit 300 is attached, as an end effector, to the tip portion of the arm 220, that is, the arm component 226 in a state of being fixed by screwing or the like.

The liquid discharge unit 300 is a device having a head 310 that discharges ink which is an example of a liquid toward the workpiece W. In the present embodiment, the liquid discharge unit 300 includes a pressure adjustment valve 320 that adjusts a pressure of the ink to be supplied to the head 310, and a sensor 330 that measures a distance from the workpiece W in addition to the head 310. Since both the pressure adjustment valve and the sensor are fixed to the arm component 226, a relationship between the positions and the poses is fixed.

The ink is not particularly limited, and is, for example, an aqueous ink in which a coloring material such as a dye or a pigment is dissolved in an aqueous solvent, a curable ink using a curable resin such as an ultraviolet curable type, a solvent-based ink in which a coloring material such as a dye or a pigment is dissolved in an organic solvent, and the like may be used. The ink is not limited to a solution, and may be an ink in which a coloring material or the like is dispersed, as a dispersant, in a dispersion medium. The ink is not limited to the ink containing the coloring material, and may be an ink containing, as a dispersant, conductive particles such as metal particles for forming a wiring or the like.

Although not illustrated in FIG. 1, the head 310 has piezoelectric elements, cavities for accommodating the ink, and nozzles N communicatively coupled to the cavities. Here, the piezoelectric element is provided for each cavity, and the ink is discharged from the nozzle N corresponding to the cavity by individually changing a pressure of the cavity. Such a head 310 is obtained, for example, by bonding a plurality of substrates such as a silicon substrate processed appropriately by etching or the like with an adhesive or the like. The piezoelectric element corresponds to a piezoelectric element 311 illustrated in FIG. 2 to be described later. As a driving element for discharging the ink from the nozzles N, a heater for heating the ink in the cavities may be used instead of the piezoelectric elements.

The pressure adjustment valve 320 is a valve mechanism that opens and closes according to the pressure of the ink in the head 310. By this opening and closing, since the pressure of the ink in the head 310 is maintained at a negative pressure within a predetermined range, a meniscus of the ink formed in the nozzles N is stabilized.

The sensor 330 is an optical displacement sensor that measures a distance between the head 310 and the workpiece W.

The liquid supply unit 400 is a mechanism for supplying the ink to the head 310. The liquid supply unit 400 has a liquid reservoir 410 and a supply flow path 420.

The liquid reservoir 410 is a container that reserves the ink. The liquid reservoir 410 is, for example, a bag-shaped ink pack made of a flexible film.

The supply flow path 420 is a flow path for supplying the ink from the liquid reservoir 410 to the head 310. The pressure adjustment valve 320 is provided in the middle of the supply flow path 420. Thus, even though a positional relationship between the head 310 and the liquid reservoir 410 changes, a fluctuation in the pressure of the ink in the head 310 can be reduced.

The supply flow path 420 is, for example, an internal space of a pipe body. Here, the pipe body used for the supply flow path 420 is made of, for example, an elastic material such as a rubber material, and has flexibility. Accordingly, even though a position or a pose of the head 310 changes while the position and the pose of the liquid reservoir 410 are fixed, the ink can be supplied from the liquid reservoir 410 to the pressure adjustment valve 320.

The controller 600 is a robot controller that controls the driving of the robot 200. Although not illustrated in FIG. 1, a control module for controlling a discharge operation in the liquid discharge unit 300 is electrically coupled to the controller 600. A computer is coupled to the controller 600 and the control module so as to be able to communicate with. The control module corresponds to a control module 500 illustrated in FIG. 2 to be described later. The computer corresponds to a computer 700 illustrated in FIG. 2 to be described later.

1-2. Electrical Configuration of Three-Dimensional Object Printing Apparatus 100

Figure 2:
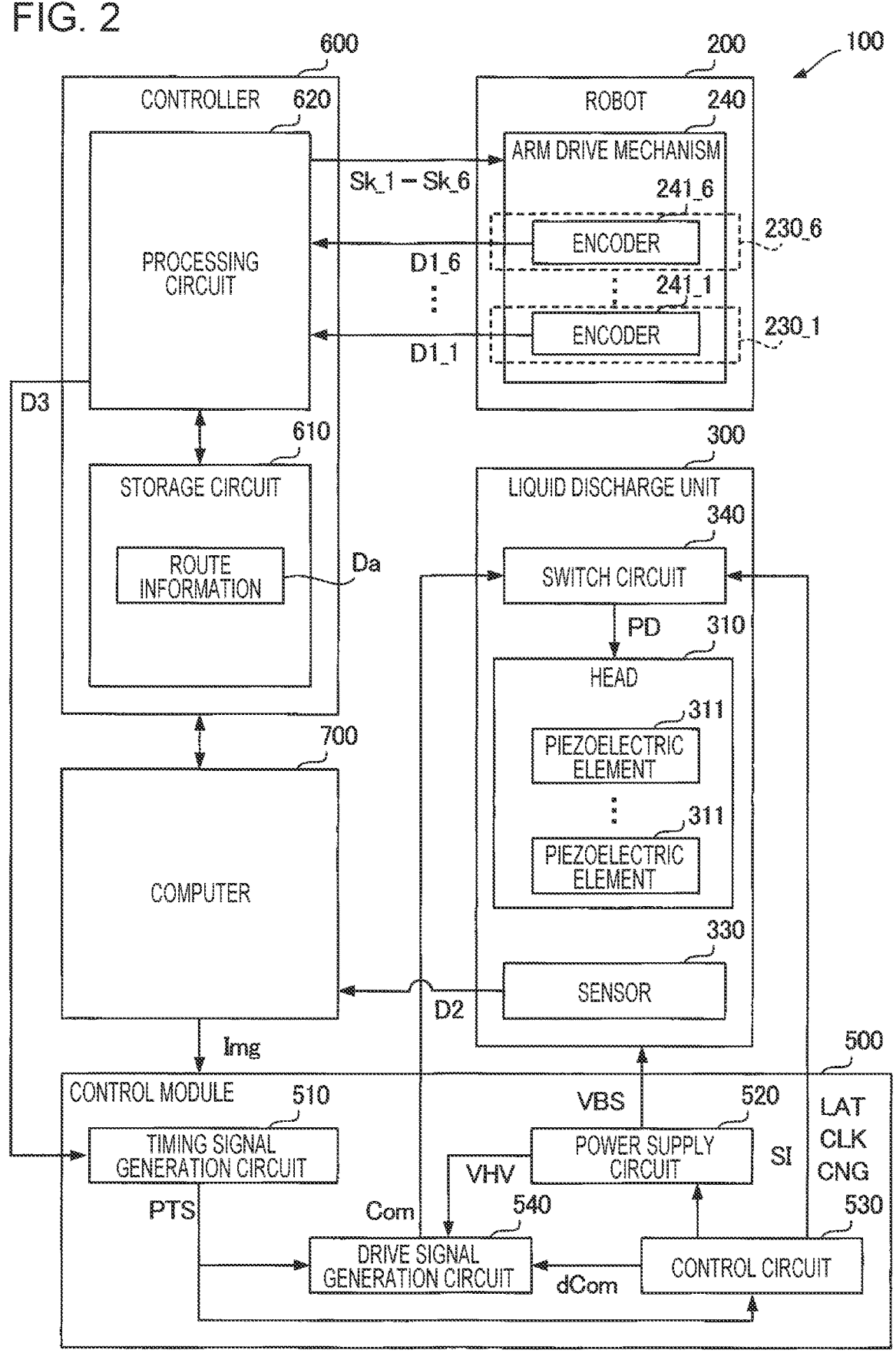
FIG. 2 is a block diagram illustrating an electrical configuration of the three-dimensional object printing apparatus 100 according to the first embodiment.

FIG. 2 is a block diagram illustrating an electrical configuration of the three-dimensional object printing apparatus 100 according to the first embodiment. FIG. 2 illustrates electrical components among the components of the three-dimensional object printing apparatus 100. FIG. 2 illustrates the arm drive mechanism 240 including an encoder 241_1 to an encoder 241_6. The arm drive mechanism 240 is the aggregate of the above-mentioned drive mechanisms that operate the joint 230_1 to the joint 230_6. The encoder 241_1 to the encoder 241_6 are provided so as to correspond to the joint 230_1 to the joint 230_6, and measure operation amounts such as rotation angles of the encoder 241_1 to the encoder 241_6. Hereinafter, each of the encoder 241_1 to the encoder 241_6 may be referred to as the encoder 241.

As illustrated in FIG. 2, the three-dimensional object printing apparatus 100 includes the control module 500, and the computer 700 in addition to the robot 200, the liquid discharge unit 300, and the controller 600 described above. Each of the electrical components to be described below may be divided appropriately, a part thereof may be included in another component, or may be integrally formed with another component. For example, a part or all of functions of the control module 500 or the controller 600 may be realized by the computer 700 coupled to the controller 600, or may be realized by another external device such as a personal computer (PC) coupled to the controller 600 via a network such as a local area network (LAN) or the Internet.

The controller 600 has a function of controlling the driving of the robot 200 and a function of generating a signal D3 for synchronizing a discharge operation of the head 310 with an operation of the robot 200. The controller 600 has a storage circuit 610 and a processing circuit 620.

The storage circuit 610 stores various programs executed by the processing circuit 620 and various kinds of data processed by the processing circuit 620. A part or all of the storage circuit 610 may be included in the processing circuit 620.

Route information Da is stored in the storage circuit 610. The route information Da is information indicating a movement route along which the head 310 moves. Specifically, the route information Da includes information indicating a route along which a tool center point indicating an origin of a tool coordinate system moves. The route information Da is represented by using, for example, coordinate values of the base coordinate system. The route information Da is determined based on workpiece information indicating a position and a shape of the workpiece W, and is input from the computer 700 to the storage circuit 610. The route information Da may indicate one movement route or may indicate a plurality of movement routes. In the first embodiment, the route information Da will be described as indicating one movement route.

The processing circuit 620 controls an movements of each of the joint 230_1 to the joint 230_6 based on the route information Da, and generates the signal D3. Specifically, the processing circuit 620 performs an inverse kinematics calculation which is a calculation for converting the route information Da into an operation amount such as a rotation angle and a rotation speed of each of the joint 230_1 to the joint 230_6. The processing circuit 620 outputs a control signal Sk_1 to a control signal Sk_6 based on an output signal D1_1 to an output signal D1_6 of the encoder 241_1 to the encoder 241_6 included in the arm drive mechanism 240 of the robot 200 such that an operation amount such as an actual rotation angle and an actual rotation speed of each of the joint 230_1 to the joint 230_6 becomes the above-described calculation result. Each of the control signal Sk_1 to the control signal Sk_6 corresponds to each of the joint 230_1 to the joint 230_6, and controls the driving of the motor provided in the corresponding joint 230. Each of the output signal D1_1 to the output signal D1_6 corresponds to each of the encoder 241_1 to the encoder 241_6. Hereinafter, each of the output signal D1_1 to the output signal D1_6 may be referred to as an output signal D1.

The processing circuit 620 generates the signal D3 based on the output signal D1 from at least one of the encoder 241_1 to the encoder 241_6. The processing circuit 620 includes, for example, one or more processors such as a central processing unit (CPU).

The control module 500 is a circuit that controls the discharge operation of the head 310 based on the signal D3 output from the controller 600 and print data Img from the computer 700. The control module 500 includes a timing signal generation circuit 510, a power supply circuit 520, a control circuit 530, and a drive signal generation circuit 540.

The timing signal generation circuit 510 generates a timing signal PTS based on the signal D3. The timing signal generation circuit 510 is, for example, a timer that starts generating the timing signal PTS when the signal D3 is detected.

The power supply circuit 520 receives a power from a commercial power supply (not illustrated) and generates various predetermined potentials. The generated various potentials are appropriately supplied to each portion of the three-dimensional object printing apparatus 100. For example, the power supply circuit 520 generates a power supply potential VHV and an offset potential VBS. The offset potential VBS is supplied to the liquid discharge unit 300. The power supply potential VHV is supplied to the drive signal generation circuit 540.

The control circuit 530 generates a control signal SI, a waveform designation signal dCom, a latch signal LAT, a clock signal CLK, and a change signal CNG based on the timing signal PTS. These signals are synchronized with the timing signal PTS. Of these signals, the waveform designation signal dCom is input to the drive signal generation circuit 540, and the other signals are input to a switch circuit 340 of the liquid discharge unit 300. The control circuit 530 includes, for example, one or more processors such as a central processing unit (CPU).

The control signal SI is a digital signal for designating an operation state of the piezoelectric element 311 included in the head 310. Specifically, the control signal SI designates whether or not to supply the drive signal Com, to be described later, to the piezoelectric element 311. By this designation, for example, whether or not to discharge the ink from the nozzle N corresponding to the piezoelectric element 311 is individually designated, and the amount of ink discharged from the nozzle N is designated. The waveform designation signal dCom is a digital signal for defining a waveform of the drive signal Com. The latch signal LAT and the change signal CNG are used in combination with the control signal SI, and define a drive timing of the piezoelectric element 311 to define a discharge timing of the ink from the nozzle N. The clock signal CLK is a reference clock signal synchronized with the timing signal PTS. Of the above signals, the signal input to the switch circuit 340 of the liquid discharge unit 300 will be described in detail later.

The drive signal generation circuit 540 is a circuit that generates the drive signal Com for driving each piezoelectric element 311 included in the head 310. Specifically, the drive signal generation circuit 540 has, for example, a DA conversion circuit and an amplifier circuit. In the drive signal generation circuit 540, the DA conversion circuit converts the waveform designation signal dCom from the control circuit 530 from a digital signal to an analog signal, and the amplifier circuit amplifies the analog signal by using the power supply potential VHV from the power supply circuit 520 to generate the drive signal Com. Here, among waveforms included in the drive signal Com, a signal of the waveform actually supplied to the piezoelectric element 311 is a drive pulse PD. The drive pulse PD is supplied from the drive signal generation circuit 540 to the piezoelectric element 311 via the switch circuit 340. The switch circuit 340 switches whether or not to supply, as the drive pulse PD, at least a part of the waveforms included in the drive signal Com based on the control signal SI.

The computer 700 has a function of supplying information such as the route information Da to the controller 600 and a function of supplying information such as the print data Img to the control module 500. For example, the computer 700 generates the route information Da based on the workpiece information indicating the position and shape of the workpiece W, and supplies the generated route information Da to the controller 600. The computer 700 of the present embodiment is electrically coupled to the sensor 330 described above, and supplies information for correcting the route information Da to the controller 600 based on the signal D2 from the sensor 330. The computer 700 is, for example, a PC. The computer 700 functions as a controller of the three-dimensional object printing apparatus 100, and causes the robot 200 and the liquid discharge unit 300 to execute a first printing operation and a second printing operation, to be described later, via the controller 600 and the control module 500.

1-3. Liquid Discharge Unit

Figure 3:
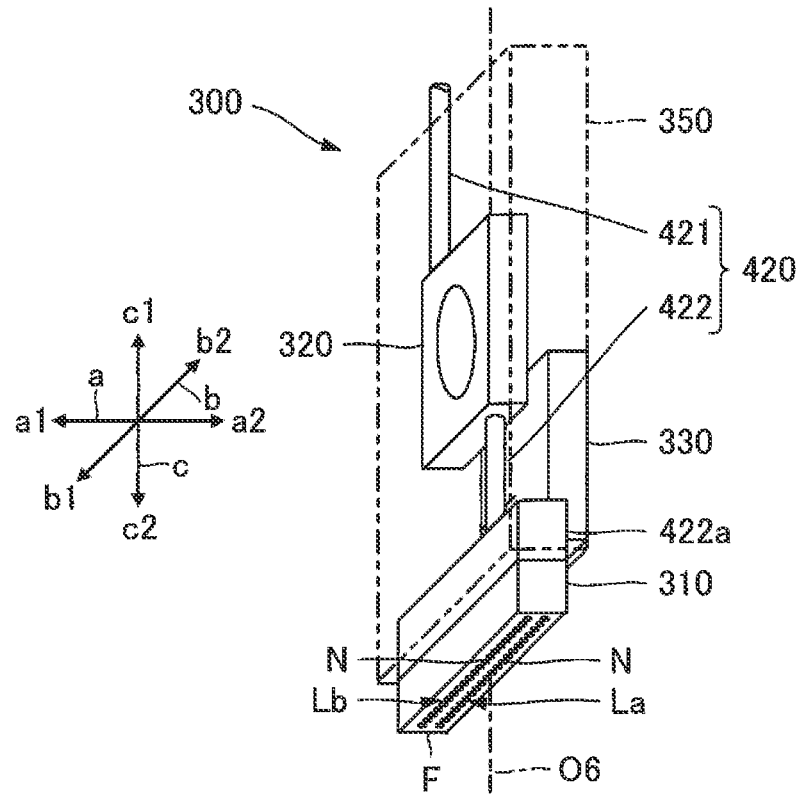
FIG. 3 is a perspective view illustrating a schematic configuration of a liquid discharge unit 300 according to the first embodiment.

FIG. 3 is a perspective view illustrating a schematic configuration of the liquid discharge unit 300 according to the first embodiment.

The following description will be performed by using an a-axis, a b-axis, and a c-axis that intersect each other as appropriate. One direction along the a-axis is referred to as an a1 direction, and a direction opposite to the a1 direction is referred to as an a2 direction. Similarly, directions opposite to each other along the b-axis are referred to as a b1 direction and a b2 direction. Directions opposite to each other along the c-axis are referred to as a c1 direction and a c2 direction.

Here, the a-axis, the b-axis, and the c-axis are coordinate axes of a tool coordinate system set in the liquid discharge unit 300, and a relationship between positions and poses relative to the above-mentioned X-axis, Y-axis, and Z-axis changes by the operation of the above-mentioned robot 200. In the example illustrated in FIG. 3, the c-axis is an axis parallel to the above-mentioned rotation axis O6. Although the a-axis, the b-axis, and the c-axis are typically orthogonal to each other, the present disclosure is not limited thereto, and the axes may intersect at an angle within, for example, a range of 80 degrees or more and 100 degrees or less.

As described above, the liquid discharge unit 300 has the head 310, the pressure adjustment valve 320, and the sensor 330. These portions are supported by a support 350 illustrated by a dashed double-dotted line in FIG. 3.

The support 350 is made of, for example, a metal material or the like, and is a substantially rigid body. In FIG. 3, the support 350 has a flat box shape, but a shape of the support 350 is not particularly limited and is any shape.

The above support 350 is attached to the tip portion of the arm 220, that is, the arm component 226. Thus, each of the head 310, the pressure adjustment valve 320, and the sensor 330 is fixed to the arm component 226.

In the example illustrated in FIG. 3, the pressure adjustment valve 320 is positioned in the c1 direction with respect to the head 310. The sensor 330 is positioned in the a2 direction with respect to the head 310.

The supply flow path 420 is divided into an upstream flow path 421 and a downstream flow path 422 by the pressure adjustment valve 320. That is, the supply flow path 420 has the upstream flow path 421 that communicatively couples the liquid reservoir 410 and the pressure adjustment valve 320, and the downstream flow path 422 that communicatively couples the pressure adjustment valve 320 and the head 310. In the example illustrated in FIG. 3, a part of the downstream flow path 422 of the supply flow path 420 is formed by a flow path member 422a. The flow path member 422a has a flow path for distributing the ink from the pressure adjustment valve 320 to a plurality of locations of the head 310. The flow path member 422a is, for example, a stacked body of a plurality of substrates made of a resin material, and a groove or a hole for a flow path of the ink is appropriately provided in each substrate.

The head 310 has a nozzle surface F and a plurality of nozzles N opened to the nozzle surface F. In the example illustrated in FIG. 3, a normal direction of the nozzle surface F is the c2 direction, and the plurality of nozzles N are divided into a first nozzle array La and a second nozzle array Lb arranged at intervals in a direction along the a-axis. Each of the first nozzle array La and the second nozzle array Lb is a set of the plurality of nozzles N linearly arrayed in a direction along the b-axis. Here, in the head 310, elements related to each nozzle N of the first nozzle array La and elements related to each nozzle N of the second nozzle array Lb are substantially symmetrical with each other in the direction along the a-axis.

However, positions of the plurality of nozzles N in the first nozzle array La and the plurality of nozzles N in the second nozzle array Lb in the direction along the b-axis may or may not coincide with each other. The elements related to each nozzle N of one of the first nozzle array La and the second nozzle array Lb may be omitted. Hereinafter, a configuration in which the positions of the plurality of nozzles N in the first nozzle array La and the plurality of nozzles N in the second nozzle array Lb in the direction along the b-axis coincide with each other is exemplified.

In the present embodiment, a nozzle density of each nozzle N included in each nozzle array in the direction along the b-axis is 300 npi (number of nozzles/inch). However, the present disclosure is not limited thereto, and the nozzle density may be a lower nozzle density, and may be greater than or equal to 25 npi from the viewpoint of printing quality and efficiency. When the head 310 having such a nozzle density is used, the effect of the present disclosure becomes remarkable since it is easily affected by vibration to be described later. In order to realize such a nozzle density, the nozzles N may be arranged in a staggered manner in each nozzle array.

Figure 4:
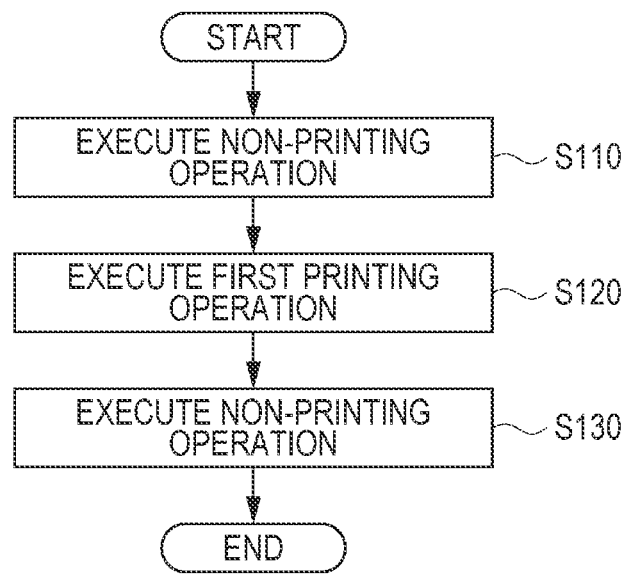
FIG. 4 is a diagram illustrating a flowchart illustrating a flow of a three-dimensional object printing method according to the first embodiment.

1-4. Operation of Three-Dimensional Object Printing Apparatus 100 and Three-Dimensional Object Printing Method FIG. 4 is a flowchart illustrating a flow of a three-dimensional object printing method according to the first embodiment. The three-dimensional object printing method is performed by using the above-mentioned three-dimensional object printing apparatus 100. As illustrated in FIG. 4, the three-dimensional object printing apparatus 100 executes step S110 of executing a non-printing operation, step S120 of executing a first printing operation, and step S130 of executing the non-printing operation in this order. The operation illustrated in FIG. 4 is executed by the computer 700 controlling the robot 200 and the liquid discharge unit 300 via the controller 600 and the control module 500.

The non-printing operation of step S110 is an operation in which the robot 200 changes a relative position of the head 310 with respect to the workpiece W before the first printing operation. In the non-printing operation, the head 310 does not discharge the ink. The non-printing operation includes, for example, an operation in which the robot 200 moves the head 310 to a printing start position PS illustrated in FIGS. 5 and 6, and a preparation operation such as an operation in which the rotation axis O2, the rotation axis O3, and the rotation axis O5 are parallel to each other. The fact that the rotation axis O2, the rotation axis O3, and the rotation axis O5 are parallel to each other means that the rotation axis O2 and the rotation axis O3 are parallel to each other, the rotation axis O3 and the rotation axis O5 are parallel to each other, and the rotation axis O2 and the rotation axis O5 are parallel to each other. In the non-printing operation, all of the six joints 230 of the robot 200 can be moved, and the head 310 is moved by the movement of a larger number of joints 230 than in the first printing operation. The operation in which the robot 200 moves the head 310 to the printing start position PS includes an acceleration operation in which a moving speed of the head 310 is accelerated.

The first printing operation in step S120 is an operation in which the head 310 discharges the ink while the robot 200 changes the relative position of the head 310 with respect to the workpiece W. During the execution of the first printing operation, the head 310 moves away from the base portion 210. In the following description, the "printing operation" is an operation in which the head 310 discharges the ink while the robot 200 changes the relative position of the head 310 with respect to the workpiece W. The "first printing operation" is a printing operation, and is an operation in which the head 310 moves away from the base portion 210. In the first embodiment, the three-dimensional object printing apparatus 100 executes the first printing operation once.

In the present embodiment, the fact that "the head 310 moves away from the base portion 210" means that, at a printing start time at which the execution of the first printing operation is started and a printing end time at which the execution of the first printing operation is ended, a linear distance between the head 310 and the base portion 210 at the printing end time is greater than a linear distance between the head 310 and the base portion 210 at the printing start time. In the present embodiment, although the head 310 may temporarily move to approach the base portion 210 between the printing start time and the printing end time, the head 310 may move away from the base portion 210 without temporarily approaching the base portion. The start of the printing operation means that the head 310 starts discharging the ink to the workpiece W. The end of the printing operation means that the head 310 stops discharging the ink to the workpiece W.

Although the number of joints 230 that move in the first printing operation among the plurality of joints 230 is not particularly limited, in the first printing operation, the head 310 may be moved by the movement of a smaller number of joints 230 than in the non-printing operation. As compared to the non-printing operation, the deviation of an actual movement route from an ideal movement route of the head 310 is reduced by operating a smaller number of joints 230. In the first printing operation according to the present embodiment, the head 310 is moved by the movement of three joints 230 among the six joints 230 of the robot 200. The first printing operation will be described in detail later.

The non-printing operation of step S130 is an operation in which the robot 200 changes the relative position of the head 310 with respect to the workpiece W after the first printing operation. In the non-printing operation, the head 310 does not discharge the ink. The non-printing operation includes, for example, an operation in which the robot 200 moves the head 310 from a printing end position PE illustrated in FIGS. 5 and 6 to another position. In the non-printing operation, all of the six joints 230 of the robot 200 can be moved, and the head 310 is moved by the movement of a larger number of joints 230 than in the first printing operation.

Figure 5:
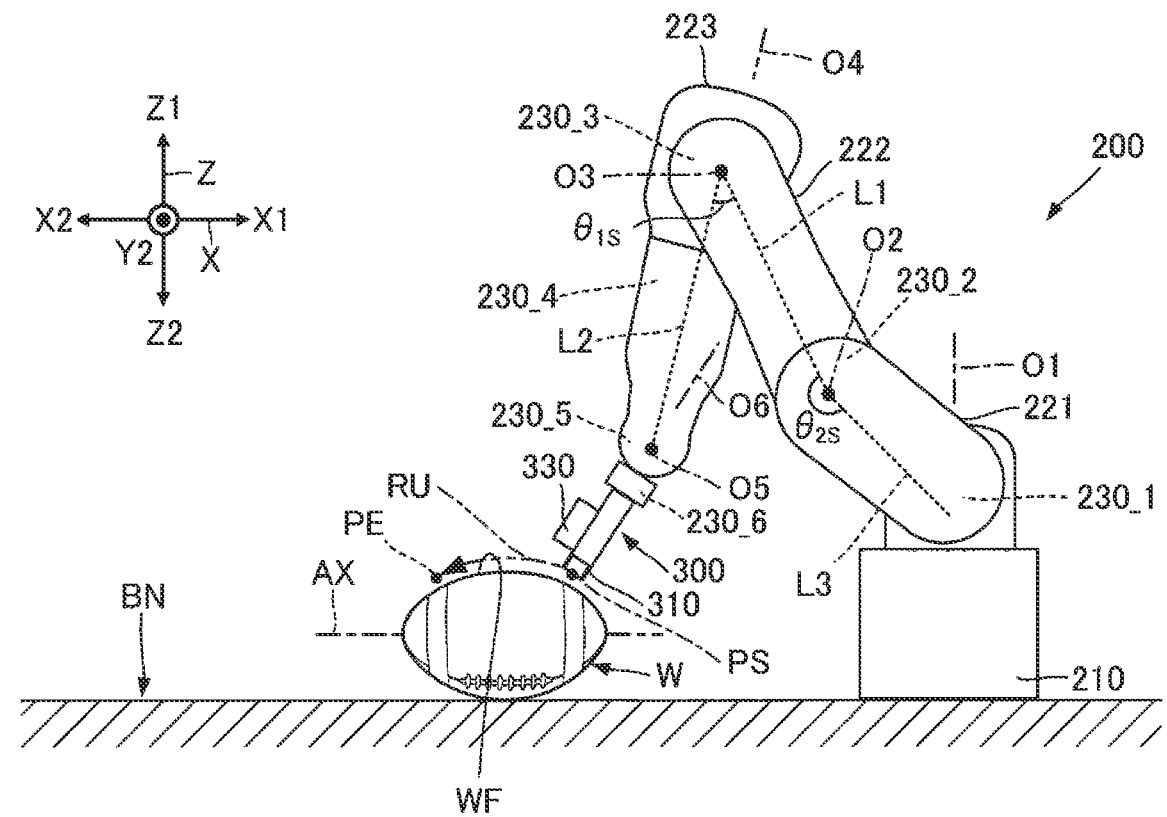
FIG. 5 is a diagram illustrating a movement route RU of a head 310 with respect to a workpiece W according to the first embodiment.
Figure 6:
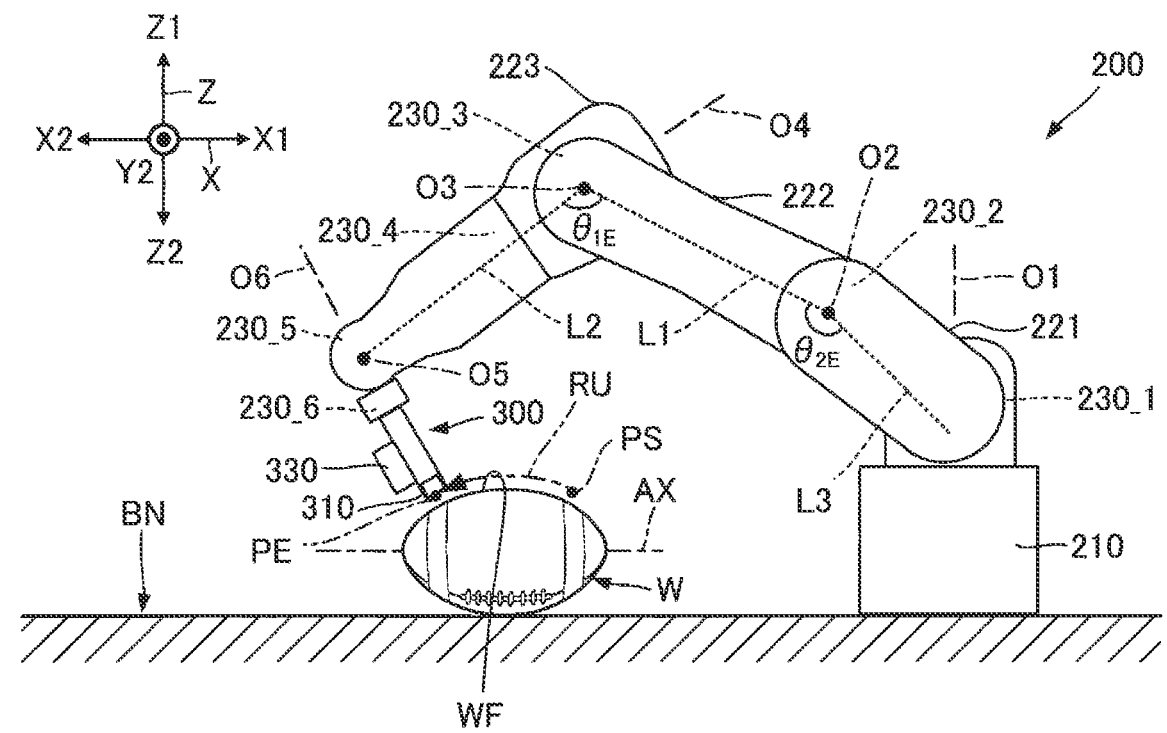
FIG. 6 is a diagram illustrating the movement route RU of the head 310 with respect to the workpiece W according to the first embodiment.

FIGS. 5 and 6 are diagrams illustrating a movement route RU of the head 310 with respect to the workpiece W according to the first embodiment. In FIGS. 5 and 6, a case where printing is performed on the surface WF of the workpiece W disposed such that the long axis AX is parallel to the X-axis is exemplified. Here, the workpiece W is mounted at a position in the X2 direction with respect to the robot 200.

In the first printing operation, as illustrated in FIGS. 5 and 6, the robot 200 moves the head 310 along the movement route RU. The movement route RU is a route along the surface WF from the printing start position PS to the printing end position PE. The movement route RU has a linear shape extending along the X-axis a viewed in the Z2 direction. The movement route RU is a route indicated by the route information Da. The printing start position PS is positioned in the X1 direction as compared with the printing end position PE. The printing start position PS is positioned close to the base portion 210 as compared to the printing end position PE. For example, the computer 700 generates the route information Da indicating the movement route RU on which the printing start position PS is positioned closer to the base portion 210 than the printing end position PE.

In the first printing operation, the robot 200 moves three joints 230 among the six joints 230. In the example illustrated in FIG. 5, the robot 200 sets the rotation axes of the joint 230_2, the joint 230_3, and the joint 230_5 to be in a state parallel to the Y-axis during the execution of the first printing operation, and moves these joints 230. As stated above, the head 310 can be moved along the movement route RU by the movement of the three joints 230.

During the execution of the first printing operation, the robot 200 moves the three joints 230 among the six joints 230 such that the b-axis of the tool coordinate system set in the liquid discharge unit 300 and the Y-axis of the base coordinate system are maintained in parallel with each other. That is, during the execution of the printing operation, the robot 200 maintains the first nozzle array La and the second nozzle array Lb to be in parallel with the three joints 230 to be moved. In other words, during the execution of the first printing operation, the robot 200 does not move the joint 230_1, the joint 230_4, and the joint 230_6 which are the joints 230 of which the rotation axes are not parallel to the Y-axis.

FIG. 5 illustrates the state of the robot 200 at the start of the first printing operation, and FIG. 6 illustrates the state of the robot 200 at the end of the first printing operation. As described above, during the execution of the first printing operation, the head 310 moves away from the base portion 210. Focusing on the movement of the arm component during the execution of the first printing operation, as illustrated in FIGS. 5 and 6, the head 310 moves such that a first angle $\theta_1$ which is an angle formed by the arm component 223 and the arm component 222 increases during the execution of the first printing operation. The first angle $\theta_1$ is a general term for a first angle $\theta_{1S}$ illustrated in FIG. 5 and a first angle $\theta_{1E}$ illustrated in FIG. 6. As illustrated in FIGS. 5 and 6, the first angle $\theta_{1E}$ is greater than the first angle $\theta_{1S}$. More specifically, the first angle $\theta_1$ is an angle which is a rotation amount when the head is rotated clockwise around an intersection of two virtual straight lines until a virtual straight line along the extending direction of the arm component 223 overlaps a virtual straight line along the extending direction of the arm component 222 as viewed in the Y1 direction. In the present embodiment, the fact that "the head 310 moves such that the first angle $\theta_1$ increases" means that, at any first time at which the first printing operation is being executed and a second time at which the first printing operation is being executed and which is later than the first time, a magnitude of the first angle $\theta_1$ at the second time is greater than or equal to the first angle $\theta_1$ at the first time. In other words, the head 310 moves such that the first angle $\theta_1$ monotonically increases in a broad sense. The first angle $\theta_{1S}$ at the start of the first printing operation may be less than or equal to 140 degrees.

The first angle $\theta_1$ can also be defined as an angle formed by a first virtual line segment L1 and a second virtual line segment L2, as illustrated in FIGS. 5 and 6. The first virtual line segment L1 is a line segment connecting the joint 230_2 and the joint 230_3. The second virtual line segment L2 is a line segment connecting the joint 230_3 and the joint 230_5. Here, since the other joint is not provided between the joint 230_2 and the joint 230_3 of the arm 220, a relative positional relationship between the joint 230_2 and the joint 230_3 does not change. That is, a length of the first virtual line segment L1 is usually constant. The joint 230_4 is provided between the joint 230_3 and the joint 230_5 of the arm 220. However, as described above, since the rotation axis O4 is an axis perpendicular to the rotation axis O3 and the rotation axis O5 is an axis perpendicular to the rotation axis O4, a relative positional relationship between the joint 230_3 and the joint 230_5 does not change. That is, a length of the second virtual line segment L2 is usually constant.

During the execution of the first printing operation, the head 310 moves such that a second angle $\theta_2$ decreases. The second angle $\theta_2$ is an angle formed by the first virtual line segment L1 and a third virtual line segment L3. The third virtual line segment L3 is a line segment connecting the joint 230_2 and the joint 230_1. The second angle $\theta_2$ is a general term for a second angle $\theta_{2S}$ illustrated in FIG. 5 and a second angle $\theta_{2E}$ illustrated in FIG. 6. As illustrated in FIGS. 5 and 6, the second angle $\theta_{2E}$ is smaller than the second angle $\theta_{2S}$. More specifically, the second angle $\theta_2$ is an angle which becomes a rotation amount when the head is rotated clockwise around an intersection of the third virtual line segment L3 and the first virtual line segment L1 until the third virtual line segment L3 overlaps the first virtual line segment L1. In the present embodiment, the fact that "the head 310 moves such that the second angle $\theta_2$ decreases" means that, at any first time at which the first printing operation is being executed and a second time at which the first printing operation is being executed and which is later than the first time, a magnitude of the second angle $\theta_2$ at the second time is less than or equal to or the second angle $\theta_2$ at the first time. In other words, the head 310 moves such that the second angle $\theta_2$ monotonically decreases in a broad sense. Since the joint 230_1 is not moving during the execution of the first printing operation, an inclination of the third virtual line segment L3 with respect to the installation surface BN is constant. Since the other joint is not provided between the joint 230_2 and the joint 230_1 of the arm 220, a relative positional relationship between the joint 230_2 and the joint 230_1 does not change. That is, a length of the third virtual line segment L3 is usually constant.

The rotation amount of the joint 230_3 during the execution of the first printing operation is greater than the rotation amount of the joint 230_2.

In the first printing operation of the present embodiment, although the three-dimensional object printing apparatus 100 sets the rotation axis O2, the rotation axis O3, and the rotation axis O5 to be parallel to each other, the present disclosure is not limited thereto, and for example, the rotation axis O2, the rotation axis O3, and the rotation axis O6 may be parallel to each other. In this case, the head 310 is moved along the movement route RU by the movements of the joint 230_2, the joint 230_3, and the joint 230_6. In this case, it is necessary to set a fixing direction of the liquid discharge unit 300 with respect to the arm component 226 to be different from the examples of FIGS. 5 and 6. For example, the liquid discharge unit 300 is fixed to the arm component 226 such that the b-axis along which the nozzle array is disposed and the rotation axis O6 are parallel to each other, and thus, the first printing operation can be performed on the workpiece W in the movement route RU.

1.5. Summary of First Embodiment

As described above, the three-dimensional object printing apparatus 100 according to the first embodiment includes the head 310 that discharges the ink to the three-dimensional workpiece W, and the robot 200 that changes the relative positions of the workpiece W and the head 310. The robot 200 includes the arm 220 and the base portion 210 coupled to one end of the arm 220. The arm 220 includes the arm component 226 which is the other end of the arm 220 and is the tip portion which supports the head 310, and the plurality of joints 230 provided on the arm 220. The three-dimensional object printing apparatus 100 executes the first printing operation in which the robot 200 moves the position of the head 310 while the ink is discharged from the head 310, and the head 310 moves away from the base portion 210 during the execution of the first printing operation. During the execution of the first printing operation, the head 310 moves away from the base portion 210, and thus, the vibration of the joint 230 caused at the time of printing can be suppressed as compared with the aspect in which the head 310 moves to approach the base portion 210. The reason why the vibration of the joint 230 caused at the time of printing can be suppressed will be described with reference to FIGS. 7 to 11.

Figure 9:
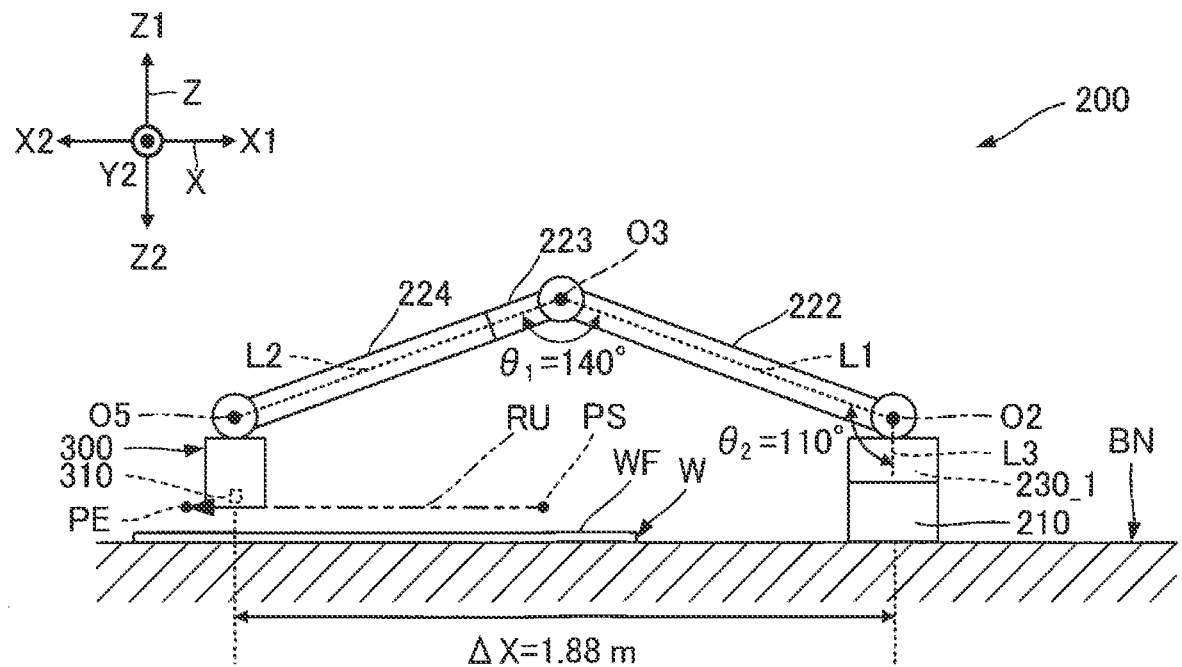
FIG. 9 is a diagram illustrating the robot 200 in a state where the position ΔX is 1.88 m.
Figure 10:
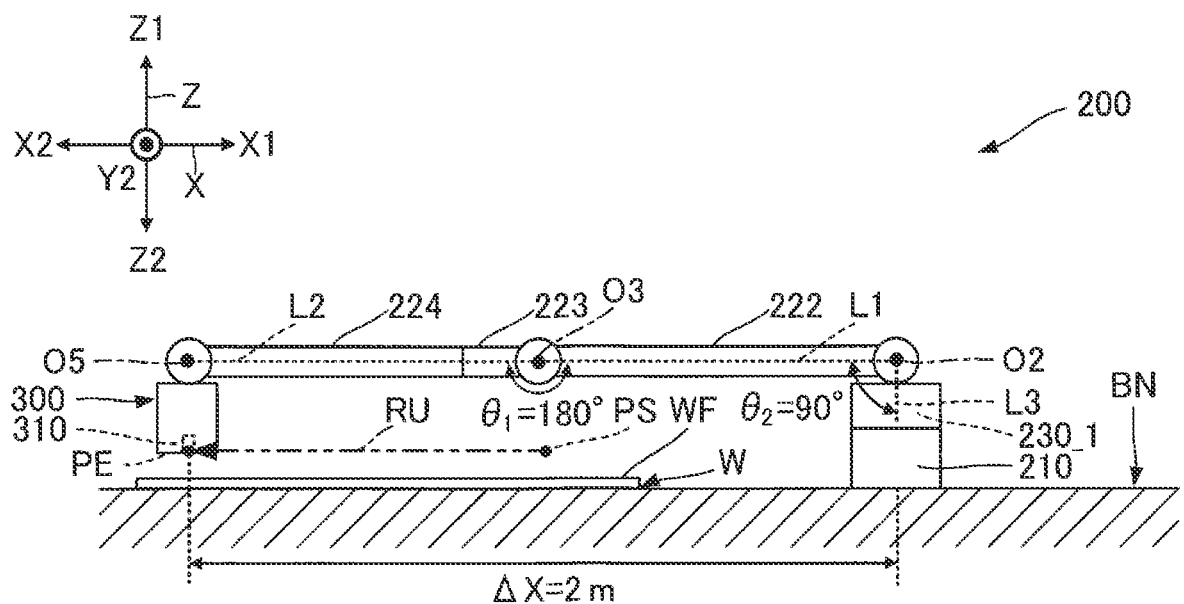
FIG. 10 is a diagram illustrating the robot 200 in a state where the position ΔX is 2 m.
Figure 11:
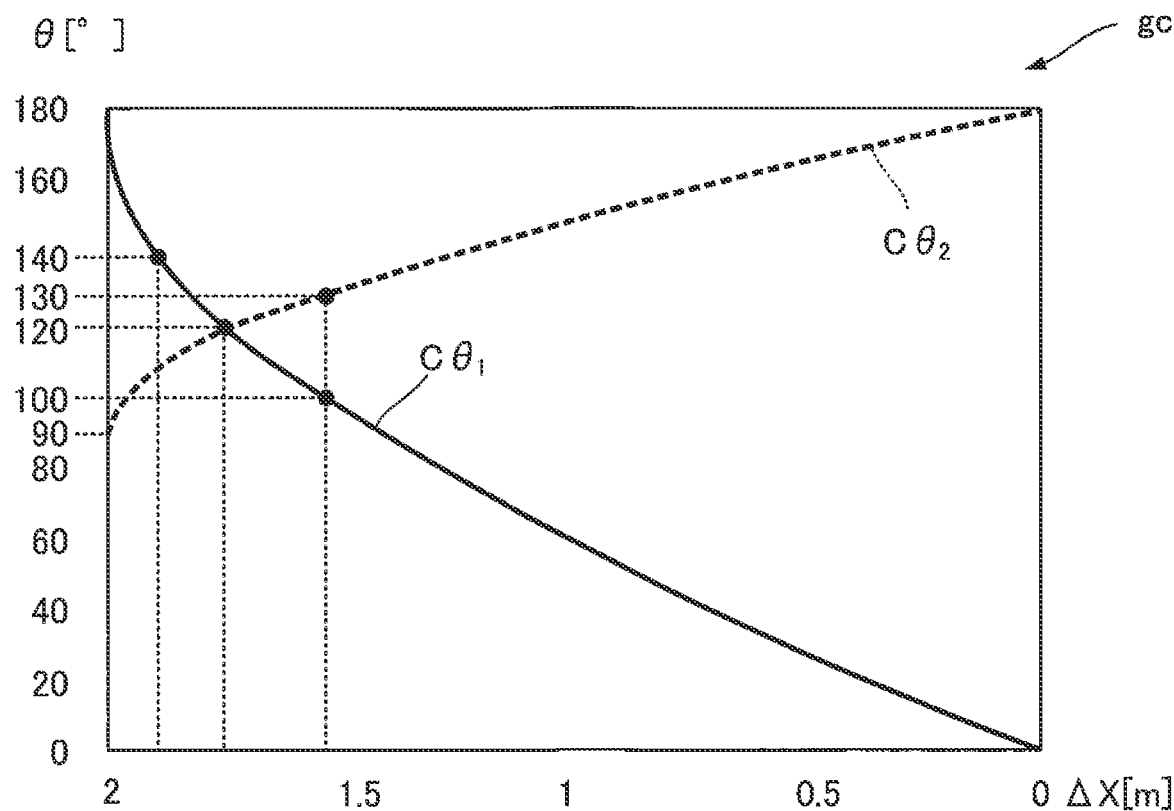
FIG. 11 is a diagram illustrating a relationship of a first angle $θ_1$ with respect to the position ΔX and a relationship of a second angle $θ_2$ with respect to the position ΔX.

In FIGS. 7 to 10, the three-dimensional object printing apparatus 100 is simplified and displayed for easy description. As part of the simplification, when a length of the arm component 222 is set to 1 meter and a total length of the arm component 223 and the arm component 224 is set to 1 meter, the head 310 is moved such that the rotation axis O2 and the rotation axis O5 are in the same position in the Z-axis direction as viewed in the Y1 direction. In FIGS. 7 to 10, for easy description, the example in which the shape of the workpiece W is a flat plate shape parallel to an XY plane, the surface WF is displayed as a surface parallel to the XY plane, and the head 310 moves along the movement route RU parallel to the X-axis from the printing start position PS away from the base portion 210 by 1 meter in the X2 direction to the printing end position PE away from the base portion by 2 meters in the X2 direction as the first printing operation is illustrated. FIGS. 7 to 11 illustrate that the position of the base portion 210 on the X-axis is used as the origin and the position of the head 310 on the X-axis is used as a position ΔX. In FIGS. 7 to 10, for easy description, a state where the angle of the third virtual line segment L3 with respect to the installation surface BN is 90 degrees when viewed in the Y1 direction will be described. In FIGS. 7 to 11, the angle is indicated by using the symbol "°". In the following description and FIGS. 7 to 11, the meter is expressed as "m". FIG. 11 illustrates a relationship between the first angle $\theta_1$ and the second angle $\theta_2$ with respect to the position ΔX of the head 310 on the X-axis.

Figure 7:
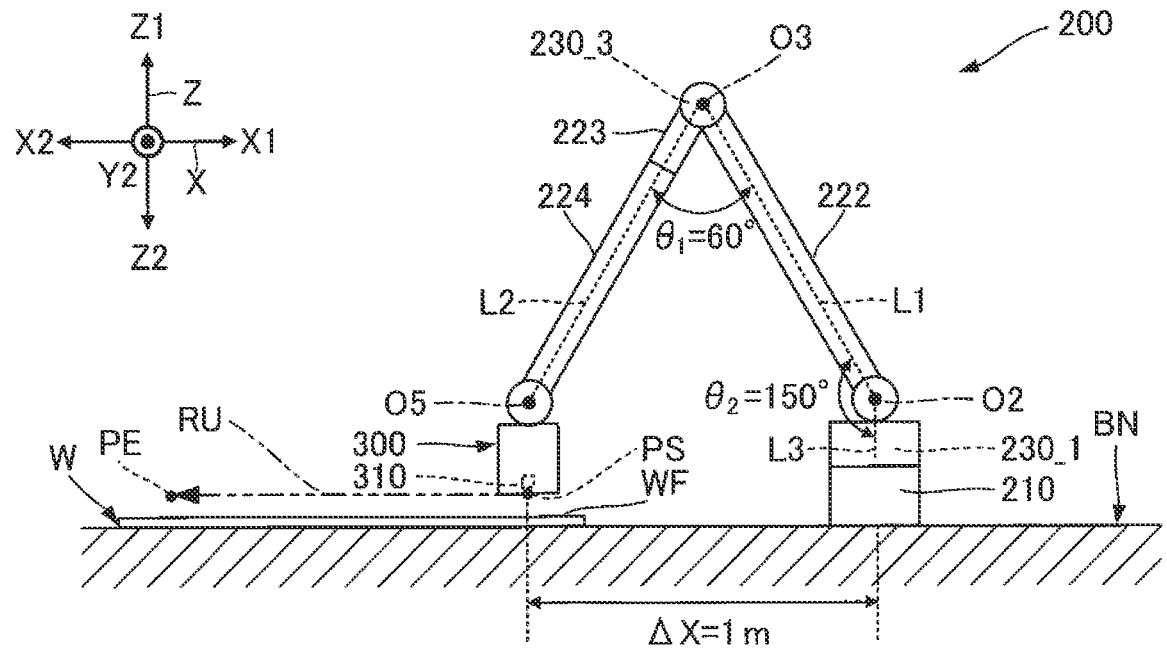
FIG. 7 is a diagram illustrating a robot 200 in a state where a position ΔX is 1 m.
Figure 8:
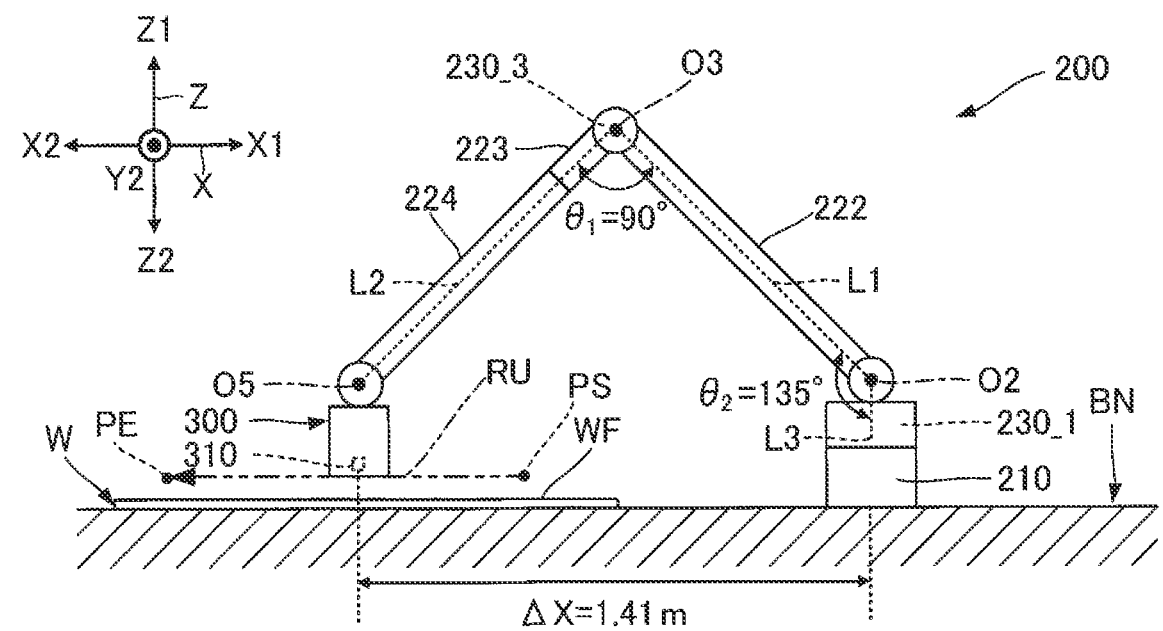
FIG. 8 is a diagram illustrating the robot 200 in a state where the position ΔX is 1.41 m.

FIG. 7 is a diagram illustrating the robot 200 in a state where the position ΔX is 1 m. FIG. 8 is a diagram illustrating the robot 200 in a state where the position ΔX is 1.41 m. FIG. 9 is a diagram illustrating the robot 200 in a state where the position ΔX is 1.88 m. FIG. 10 is a diagram illustrating the robot 200 in a state where the position ΔX is 2 m.

FIG. 7 illustrates a state where the arm 220 is appropriately bent, and the arm 220 is extended in accordance with FIGS. 8, 9, and 10, and FIG. 10 illustrates a state where the arm 220 is fully extended.

Since the lengths of the arm component 222 and the arm component 224 are the same length as 1 m, the rotation axis O2, the rotation axis O3, and the rotation axis O5 can be regarded as vertexes of an isosceles triangle as viewed in the Y1 direction. Due to the nature of the isosceles triangle, the second angle $\theta_2$ can be expressed as the following Equation (1).

$$\theta_2 = a\cos(\Delta x/2) \times 180/\pi + 90 \quad (1)$$

However, a cos( ) is a function for finding the arc cosine. π indicates the ratio of a circle's circumference to its diameter. The first angle $\theta_1$ can be expressed by the following Equation (2) by using the second angle θ2.

$$\theta_1 = (180 - \theta_2) \times 2 \quad (2)$$

When the position ΔX is 1 m, as illustrated in FIG. 7, the second angle $\theta_2$ is 150 degrees according to Equation (1). According to Equation (2), the first angle $\theta_1$ is 60 degrees.

When the position ΔX is 1.41 m, as illustrated in FIG. 8, the second angle $\theta_2$ is about 135 degrees according to Equation (1). According to Equation (2), the first angle $\theta_1$ is about 90 degrees.

When the position ΔX is 1.88 m, as illustrated in FIG. 9, the second angle $\theta_2$ is about 110 degrees according to Equation (1). According to Equation (2), the first angle $\theta_1$ is about 140 degrees.

When the position ΔX is 2 m, as illustrated in FIG. 10, the second angle $\theta_2$ is 90 degrees according to Equation (1). According to Equation (2), the first angle $\theta_1$ is 180 degrees.

FIG. 11 is a diagram illustrating a relationship of the first angle $\theta_1$ with respect to the position ΔX and a relationship of the second angle $\theta_2$ with respect to the position ΔX. A first angular characteristic $C\theta_1$ represented in a graph gc shown in FIG. 11 indicates a value of the first angle $\theta_1$ corresponding to the position ΔX. A second angular characteristic $C\theta_2$ represented in the graph gc indicates a value of the second angle $\theta_2$ corresponding to the position ΔX. A horizontal axis of the graph gc indicates the position ΔX, and a vertical axis of the graph gc indicates an angle in degrees.

Generally, the vibration is hard to be caused in the joint 230 when the rotation is stopped and when the rotation speed is constant, while the vibration is easy to be caused in the joint when the rotation speed increases or decreases. When the vibration of the joint 230 is caused once, it is difficult to suppress the vibration. The vibration caused in the joint 230 propagates to the head 310 via the arm 220, and the head 310 vibrates. When the head 310 vibrates, a difference is generated between an ideal route of the head 310 and an actual route of the head 310, print image quality deteriorates.

As represented by the first angular characteristic $C\theta_1$, the position ΔX of the head 310 on the X-axis and the first angle $\theta_1$ may not be in a proportional relationship. Specifically, when the first angle $\theta_1$ is from 0 degrees to 100 degrees, since an inclination of the first angular characteristic $C\theta_1$ is substantially constant, it can be considered that the position ΔX and the first angle $\theta_1$ are in a substantially proportional relationship. In the following description, an absolute value of the amount of change in the first angle $\theta_1$ with respect to the amount of change in the position ΔX is simply referred to as the "inclination of the first angular characteristic $C\theta_1$," for easy description. For example, when the head 310 moves in a range where the first angle $\theta_1$ is from 0 degrees to 100 degrees and the amount of change in the position ΔX per unit time is constant, since the inclination of the first angular characteristic $C\theta_1$ is substantially constant, it can be said that the amount of change in the first angle $\theta_1$ per unit time is also substantially constant. That is, in the range where the first angle $\theta_1$ is from 0 degrees to 100 degrees, it can be considered that the moving speed of the head 310 on the X-axis and the rotation speed of the joint 230_3 are in a substantially proportional relationship. On the other hand, when the first angle $\theta_1$ is from 100 degrees to 180 degrees, the inclination of the first angular characteristic $C\theta_1$ increases as the first angle $\theta_1$ increases. More specifically, the inclination of the first angular characteristic $C\theta_1$ in the range where the first angle $\theta_1$ is from 100 degrees to 120 degrees is greater than the inclination of the first angular characteristic $C\theta_1$ in the range where the first angle $\theta_1$ is from 0 degrees to 100 degrees. The inclination of the first angular characteristic $C\theta_1$ in the range where the first angle $\theta_1$ is from 120 degrees to 140 degrees is greater than the inclination of the first angular characteristic $C\theta_1$ in the range where the first angle $\theta_1$ is from 100 degrees to 120 degrees. The inclination of the first angular characteristic $C\theta_1$ in the range where the first angle $\theta_1$ is from 140 degrees to 180 degrees is greater than the inclination of the first angular characteristic $C\theta_1$ in the range where the first angle $\theta_1$ is from 120 degrees to 140 degrees. Accordingly, when the head 310 moves in the range where the first angle $\theta_1$ is from 100 degrees to 180 degrees, even though the moving speed of the head 310 on the X-axis is constant, the rotation speed of the joint 230_3 changes as the first angle $\theta_1$ increases, and the vibration caused in the joint 230_3 increases. That is, the vibration is easy to be caused in the range where the first angle $\theta_1$ is from 100 degrees to 120 degrees as compared to the case where the first angle $\theta_1$ is from 0 degrees to 100 degrees. The vibration is easy to be caused when the first angle $\theta_1$ is from 120 degrees to 140 degrees as compared to the case where the first angle $\theta_1$ is from 100 degrees to 120 degrees. The vibration is easy to be caused when the first angle $\theta_1$ is from 140 degrees to 180 degrees as compared with the case where the first angle $\theta_1$ is from 120 degrees to 140 degrees.

Similarly to the position $\Delta X$ and the first angle $\theta_1$, as represented by the second angular characteristic $C\theta_2$, the position $\Delta X$ of the head 310 on the X-axis and the second angle $\theta_2$ may not be in a proportional relationship. When the second angle $\theta_2$ is from 130 degrees to 180 degrees, since an inclination of the second angular characteristic $C\theta_2$ is substantially constant, it can be considered that the position $\Delta X$ and the second angle $\theta_2$ are in a substantially proportional relationship. In the following description, an absolute value of the amount of change of the second angle $\theta_2$ with respect to the amount of change of the position $\Delta X$ is simply referred to as the "inclination of the second angular characteristic $C\theta_2$". For example, when the head 310 moves in the range where the second angle $\theta_2$ is from 130 degrees to 180 degrees and the amount of change in the position $\Delta X$ per unit time is constant, since the inclination of the second angular characteristic $C\theta_2$ is substantially constant, it can be said that the amount of change in the second angle $\theta_2$ per unit time is also substantially constant. That is, in the range where the second angle $\theta_2$ is from 130 degrees to 180 degrees, it can be considered that the moving speed of the head 310 on the X-axis and the rotation speed of the joint 230_2 are in a substantially proportional relationship. On the other hand, when the second angle $\theta_2$ is from 90 degrees to 130 degrees, the absolute value of the inclination of the second angle $\theta_2$ increases as the second angle $\theta_2$ decreases. Accordingly, when the head 310 moves in the range where the second angle $\theta_2$ from 90 degrees to 130 degrees, even though the moving speed of the head 310 on the X-axis is constant, the rotation speed of the joint 230_2 changes as the second angle $\theta_2$ decreases, and the vibration caused in the joint 230_2 increases. That is, the vibration is easy to be caused in the range where the second angle $\theta_2$ is from 130 degrees to 90 degrees as compared with the case where the second angle $\theta_2$ is from 180 degrees to 130 degrees. Even though the second angle is from 130 degrees to 90 degrees, the vibration is easier to be caused when the second angle $\theta_2$ is small, that is, when the second angle $\theta_2$ is close to 90 degrees.

As described above, as the first angle $\theta_1$ increases and the second angle $\theta_2$ decreases, that is, the head 310 is away from the base portion 210, the vibration caused in the joint 230_3 and the joint 230_2 increases. As described above, when the vibration of the joint 230 is caused once, it is difficult to suppress the vibration. Accordingly, in the aspect in which the head 310 moves to approach the base portion 210, the vibration caused at the start of the printing operation may remain even during the execution of the printing operation, and the print image quality may deteriorate. On the other hand, in the first embodiment, since the head 310 moves away from the base portion 210 during the execution of the first printing operation, the vibration is caused near the end of the first printing operation. However, since the vibration after the end of the printing operation does not influence the print image quality, the influence of the vibration is limited as compared with the vibration caused at the start of the first printing operation. Accordingly, according to the first embodiment, the influence of the vibration during the execution of the first printing operation is reduced by transitioning from a state where the vibration is hard to be caused to a state where the vibration is easy to be caused, and printing quality can be improved. The rigidity of the arm 220 in a state where the arm 220 is appropriately bent as illustrated in FIGS. 7 and 8 is greater than the rigidity of the entire arm 220 in a state where the arm 220 is fully extended as illustrated in FIG. 10. Accordingly, the vibration is easy to be caused in a state where the arm 220 is fully extended as compared with a state where the arm 220 is appropriately bent. In particular, when a weight of the liquid discharge unit 300 is close to a load capacity of the arm 220, the robot 200 is easy to vibrate in a state where the arm 220 is fully extended or in a state where the arm is almost fully extended, but the vibration of the robot 200 can be suppressed by gradually extending the arm 220.

In FIGS. 7 to 11, for simplification of the description, although the example in which the surface WF of the workpiece W is displayed as the surface parallel to the XY plane and the head 310 moves along the X-axis as the first printing operation is illustrated, even in other examples, the vibration caused in the joint 230_3 and the joint 230_2 increases as the head 310 is away from the base portion 210. The other examples described above are a case where the surface WF is a curved surface having a non-constant curvature and a case where the movement route RU tilts with respect to the X-axis, as illustrated in FIG. 1. The joints moving in the other examples described above may include joints 230 other than the joint 230_2, the joint 230_3, and the joint 230_5. As such an example, in an arrangement relationship between the robot 200 and the workpiece W in FIG. 1, the head 310 scans on the surface WF along the route along the Y-axis as viewed in the Z-axis direction.

The strength of the vibration of the joint 230_1 during the execution of the first printing operation will be described with reference to FIGS. 12 and 13.

Figure 12:
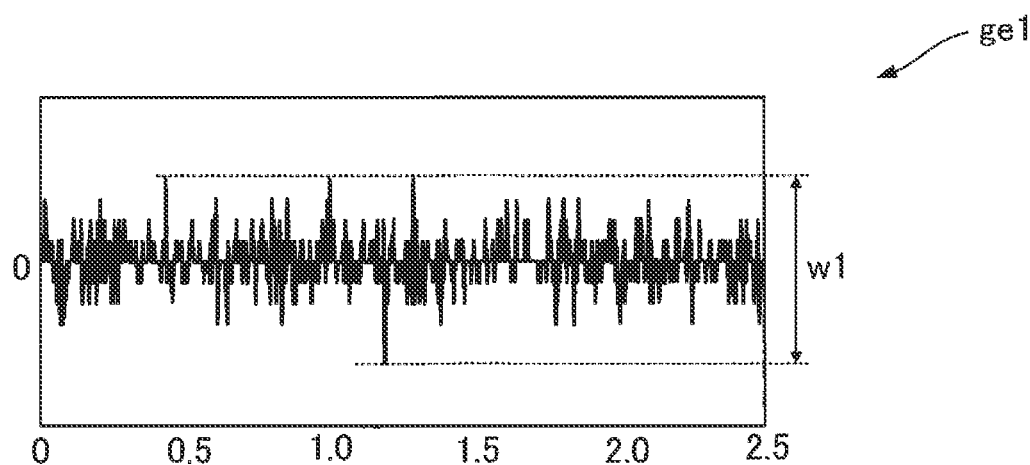
FIG. 12 is a diagram illustrating strength of vibration of a joint 230_1 according to the first embodiment.
Figure 13:
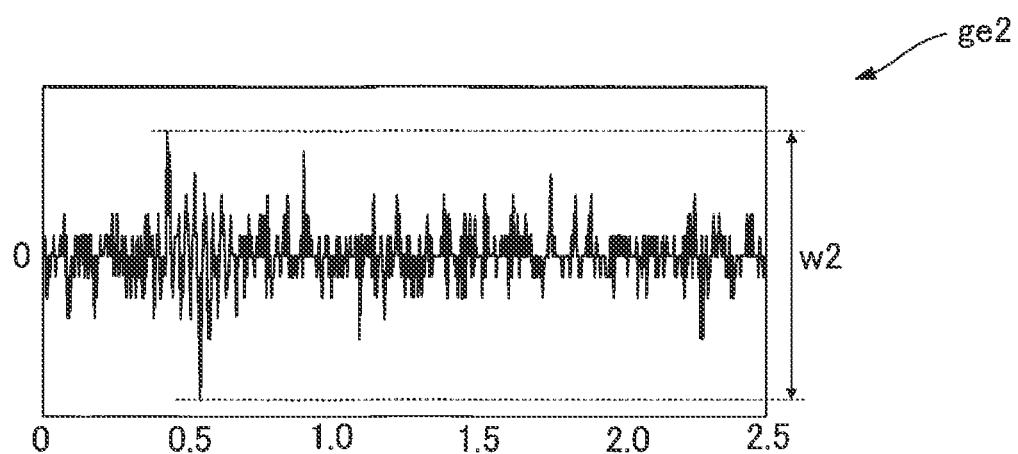
FIG. 13 is a diagram illustrating the strength of the vibration of the joint 230_1 in an aspect in which the head 310 moves to approach a base portion 210.

FIG. 12 is a diagram illustrating the strength of the vibration of the joint 230_1 according to the first embodiment. FIG. 13 is a diagram illustrating the strength of the vibration of the joint 230_1 in the aspect in which the head 310 moves to approach the base portion 210. FIG. 12 illustrates the output signal D1_1 of the encoder 241_1 during the execution of the first printing operation, and FIG. 13 illustrates the output signal D1_1 of the encoder 241_1 in the aspect in which the head 310 moves to approach the base portion 210 during the printing operation. In the first printing operation according to the present embodiment and the printing operation in the aspect in which the head 310 moves to approach the base portion 210, the motor included in the joint 230_1 does not rotate, and the driving force for rotating the arm component 221 is not generated. However, due to the vibration caused in the joint 230, the arm component 221 rotates around the rotation axis O1 with an extremely small amount.

A graph ge1 shown in FIG. 12 represents the output signal D1_1 during the execution of the first printing operation. A horizontal axis of the graph ge1 indicates an elapsed time from a point in time of the start of the first printing operation, and a vertical axis of the graph ge1 indicates a pulse value indicated by the encoder 241_1. Similarly, a graph ge2 shown in FIG. 13 represents the output signal D1_1 during execution of the printing operation in the aspect in which the head 310 moves to approach the base portion 210. A horizontal axis of the graph ge2 represents an elapsed time from a point in time of the start of the first printing operation, and a vertical axis of the graph ge2 represents a pulse value indicated by the output signal D1_1.

As represented in the graph ge1 and the graph ge2, since the arm component 221 rotates around the rotation axis O1 with an extremely small amount due to the vibration caused in the joint 230, the pulse value also vibrates. A pulse value of 0 indicates that the arm component 221 does not rotate, and a large absolute value of the pulse value indicates that the arm component 221 rotates with a relatively large amount. Accordingly, it can be said that an amplitude of the vibration of the pulse value indicates the strength of the vibration caused in the joint 230_1.

A maximum amplitude of the vibration of the pulse value in the graph ge1 is a width w1, and a maximum amplitude of the vibration of the pulse value in the graph ge2 is a width w2. The width w1 is narrower than the width w2. Accordingly, in the first embodiment, the vibration caused in the joint 230 during the first printing operation can be suppressed and the printing quality can be improved, as compared with the aspect in which the head 310 moves to approach the base portion 210.

The arm 220 includes the arm component 223 and the arm component 222 coupled to the arm component 223 and provided closer to the base portion 210 than the arm component 223. The plurality of joints 230 included in the arm 220 include the joint 230_3 coupled to the arm component 223 and the arm component 222. During the execution of the first printing operation, the head 310 moves such that the first angle $\theta_1$ formed by the arm component 223 and the arm component 222 increases. As illustrated in FIG. 11, when the first angle $\theta_1$ increases, even though the moving speed of the head 310 on the X-axis is constant, the rotation speed of the joint 230_3 changes, and the vibration caused in the joint 230_3 increases. Accordingly, the first angle $\theta_1$ is decreased at a point in time of the start of the execution of the first printing operation, and the head 310 moves such that the first angle $\theta_1$ increases during the execution of the first printing operation. Thus, the vibration caused in the joint 230_3 during the execution of the first printing operation can be suppressed, and the printing quality can be improved.

The plurality of joints 230 included in the arm 220 include the joint 230_3, the joint 230_2, and the joint 230_5. The joint 230_2 is closer to the base portion 210 than the joint 230_3. The joint 230_5 is closer to the arm component 226 than the joint 230_3. The joint 230_3 rotates around the rotation axis O3. The joint 230_2 rotates around the rotation axis O2. The joint 230_5 rotates around the rotation axis O5. The robot 200 can set the rotation axis O3, the rotation axis O2, and the rotation axis O5 to be parallel to each other. When the line segment connecting the joint 230_2 and the joint 230_3 is the first virtual line segment L1, the line segment connecting the joint 230_3 and the joint 230_5 is the second virtual line segment L2, and the angle formed by the first virtual line segment L1 and the second virtual line segment L2 is the first angle $\theta_1$, the head 310 moves such that the first angle $\theta_1$ increases during the execution of the first printing operation.

The rotation amount of the joint 230_3 during the execution of the first printing operation is greater than the rotation amount of the joint 230_2. Thus, during the execution of the first printing operation, the head 310 can move such that the first angle $\theta_1$ increases while maintaining the pose of the head 310 with respect to the workpiece W. Since it is possible to suppress the vibration of the joint 230_3 having a larger rotation amount than the joint 230_2 by moving the head 310 to be away from the base portion 210, the printing quality can be improved.

The plurality of joints 230 included in the arm 220 include the joint 230_1 provided between the joint 230_2 and the base portion 210. The joint 230_1 rotates around the rotation axis O1. When the line segment connecting the joint 230_2 and the joint 230_1 is the third virtual line segment L3 and the angle formed by the first virtual line segment L1 and the third virtual line segment L3 is the second angle $\theta_2$, the head 310 moves such that the second angle $\theta_2$ decreases during the execution of the first printing operation. As illustrated in FIG. 11, when the second angle $\theta_2$ decreases, even though the moving speed of the head 310 on the X-axis is constant, the rotation speed of the joint 230_2 changes, and the vibration caused in the joint 230_2 increases. Accordingly, at the point in time of the start of the execution of the first printing operation, the second angle $\theta_2$ is increased, and the head 310 moves such that the second angle $\theta_2$ decreases during the first printing operation. Thus, the vibration caused in the joint 230_2 during the execution of the first printing operation can be suppressed, and the printing quality can be improved.

The plurality of joints 230 included in the arm 220 include the joint 230_1 provided between the joint 230_2 and the base portion 210, the joint 230_1 rotates around the rotation axis O1, and the rotation axis O2 and the rotation axis O1 are perpendicular to each other.

The first angle $\theta_1$ at the point in time of the start of the first printing operation may be less than or equal to 140 degrees. As illustrated in FIG. 11, the inclination of the first angular characteristic $C\theta_1$ in the range where the first angle $\theta_1$ is from 140 degrees to 180 degrees is greater than the inclination of the first angular characteristic $C\theta_1$ in the range where the first angle $\theta_1$ is from 0 degrees to 140 degrees. Accordingly, since the first angle $\theta_1$ at the start of the first printing operation is less than or equal to 140 degrees, the vibration caused in the joint 230_3 can be suppressed and the printing quality can be improved, as compared to the aspect in which the first angle $\theta_1$ at the start of the first printing operation is greater than 140 degrees.

2. Second Embodiment

A three-dimensional object printing apparatus 100A according to a second embodiment is different from the first embodiment in that a first print mode and a second print mode is selectable when the printing operation is executed multiple times. When the first print mode is selected, the three-dimensional object printing apparatus 100A executes the first printing operation multiple times and does not execute the second printing operation. The second printing operation is the printing operation, and is an operation in which the head 310 moves to approach the base portion 210. In the following description, the printing operation is a general term for the first printing operation and the second printing operation. A print mode is a general term for the first print mode and the second print mode. When the second print mode is selected, the three-dimensional object printing apparatus 100A selects the first printing operation once or multiple times, and executes the second printing operation once or multiple times. The number of times the first printing operation is executed when the first print mode is selected may be set to coincide with the sum of the number of times the first printing operation is executed and the number of times the second printing operation is executed when the second print mode is selected.

Hereinafter, for easy understanding, the second embodiment will be described in conjunction with an example in which the printing operation is executed twice. Accordingly, when the first print mode is selected, the three-dimensional object printing apparatus 100A executes the first printing operation twice, and when the second print mode is selected, the three-dimensional object printing apparatus 100A executes the first printing operation once and executes the second printing operation once. When the second print mode is selected, the three-dimensional object printing apparatus 100A may first execute the first printing operation and may execute the second printing operation after the first printing operation, or may first execute the first printing operation and may execute the first printing operation after the second printing operation. The following description will be described in conjunction with an example in which the three-dimensional object printing apparatus 100A executes the second printing operation after the first printing operation when the second print mode is selected.

2-1. Electrical Configuration of Three-dimensional Object Printing Apparatus

Figure 14:
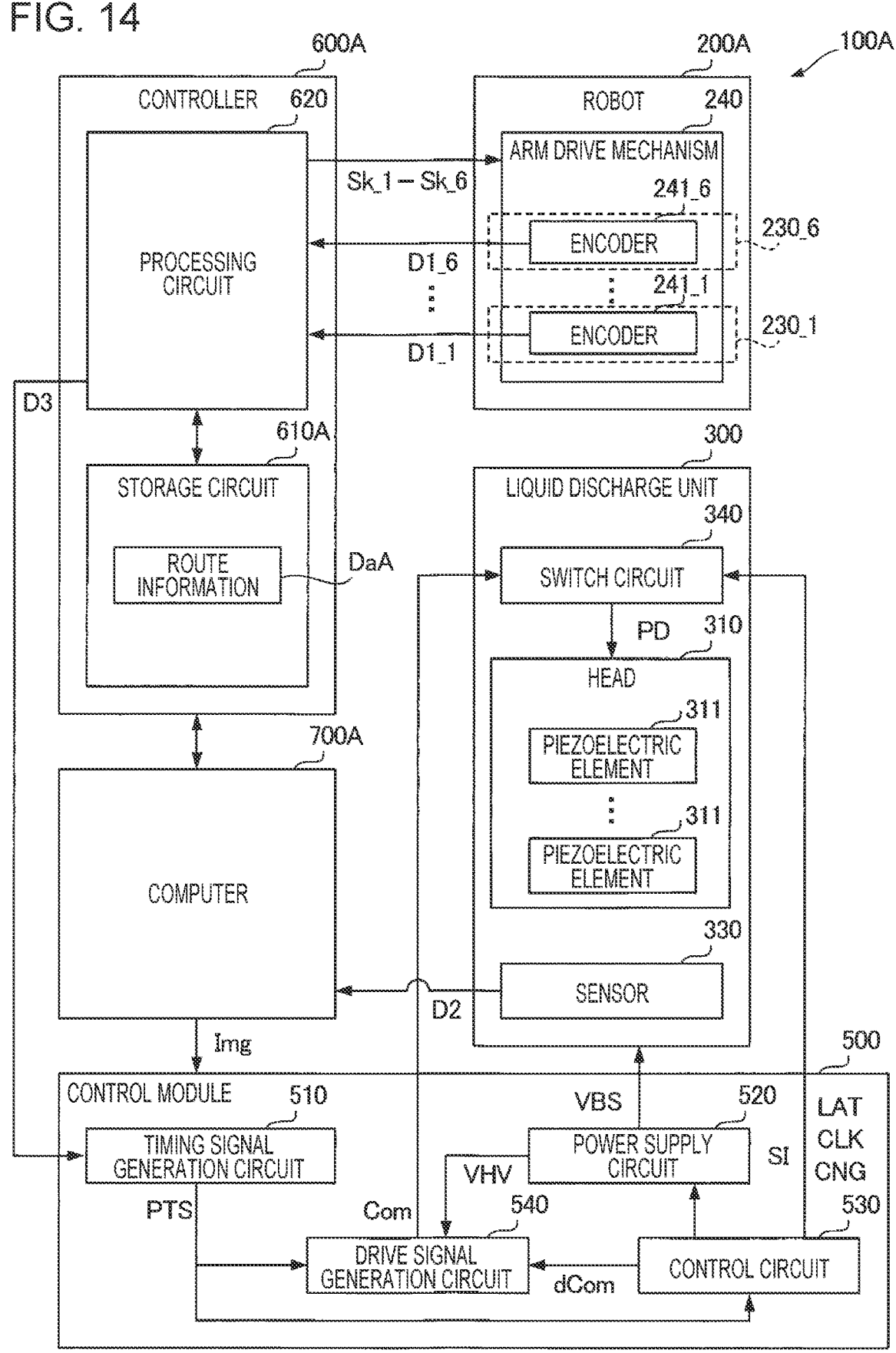
FIG. 14 is a block diagram illustrating an electrical configuration of a three-dimensional object printing apparatus 100A according to a second embodiment.

FIG. 14 is a block diagram illustrating an electrical configuration of the three-dimensional object printing apparatus 100A according to the second embodiment. The three-dimensional object printing apparatus 100A is different from the three-dimensional object printing apparatus 100 in that a computer 700A is provided instead of the computer 700, a controller 600A is provided instead of the controller 600, and a robot 200A is provided instead of the robot 200.

The computer 700A is different from the computer 700 in that the computer has a function of selecting one print mode of the first print mode and the second print mode when the printing operation is executed multiple times and a function of generating route information DaA according to the second embodiment based on the selected print mode. The controller 600A is different from the controller 600 in that a storage circuit 610A is provided instead of the storage circuit 610. The storage circuit 610A is different from the storage circuit 610 in that the route information DaA is provided instead of the route information Da. The route information DaA indicates a movement route RU for the printing operation for the first time and a movement route RU for the printing operation for the second time. The robot 200A is different from the robot 200 in that the head 310 moves based on the route information DaA.

2-2. Operation of Three-Dimensional Object Printing

Apparatus 100A and Three-Dimensional Object Printing Method

Figure 15:
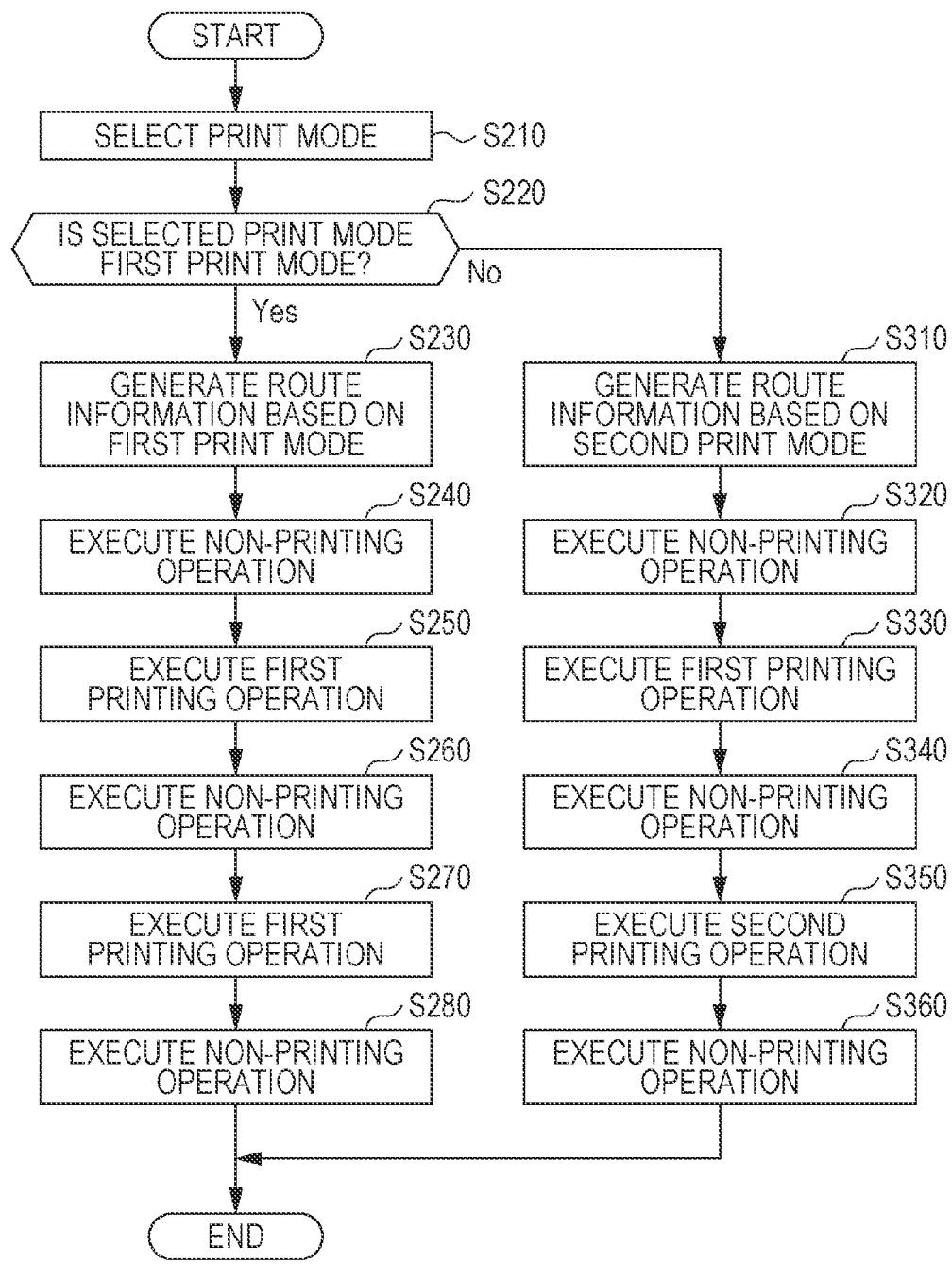
FIG. 15 is a diagram illustrating a flowchart illustrating a flow of a three-dimensional object printing method according to the second embodiment.

FIG. 15 is a flowchart illustrating a flow of a three-dimensional object printing method according to the second embodiment. The three-dimensional object printing method is performed by using the above-mentioned three-dimensional object printing apparatus 100A.

In step S210, the computer 700A selects one print mode of the first print mode and the second print mode based on one method of the following three methods.

In a first method, the computer 700A selects the print mode based on the dimension of the workpiece W. Specifically, when the dimension of the workpiece W is smaller than a predetermined threshold value, since the first angle $\theta_1$ does not increase and the vibration caused in the joint 230_3 is hard to increase, the computer 700A selects the second print mode. On the other hand, when the dimension of the workpiece W is greater than or equal to the predetermined threshold value, since the first angle $\theta_1$ may increase, the computer 700A selects the first print mode.

In a second method, the computer 700A selects one print mode of the first print mode and the second print mode based on an operation of a user who operates the computer 700A. For example, the computer 700A causes a display device of the computer 700A to display an image that causes the user to designate "quality priority mode" or "speed priority mode" as an option at the time of printing. The user designates one of "quality priority mode" and "speed priority mode" by using an input device of the computer 700A, for example, one or both of a mouse and a keyboard. The computer 700A selects the first print mode when the user designates "quality priority mode", and selects the second print mode when the user designates "speed priority mode".

In a third method, when a recording duty is greater than a predetermined ratio, the computer 700A selects the first print mode. On the other hand, when the recording duty is less than or equal to the predetermined ratio, the computer 700A selects the second print mode. This is because when the recording duty is greater than the predetermined ratio and the printing quality deteriorates, a portion where the printing quality deteriorates is easily noticeable, and the influence of the image quality becomes remarkable.

Figure 16:
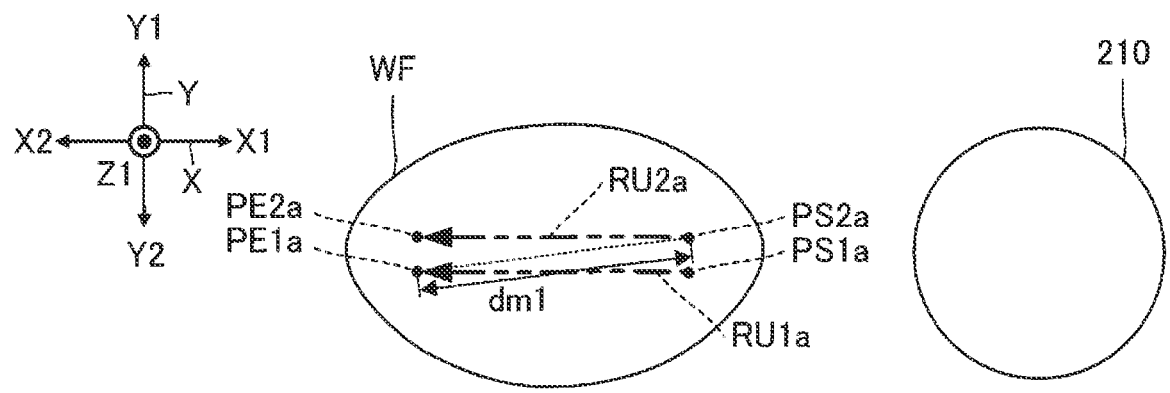
FIG. 16 is a diagram illustrating a movement route when a first print mode is selected.

After the processing of step S210 is ended, in step S220, the computer 700A determines whether or not the selected print mode is the first print mode. When the determination result in step S220 is positive, that is, when the first print mode is selected, the computer 700A generates the route information DaA indicating the movement route on which the head 310 moves away from the base portion 210 in the printing operation for the first time and for the printing operation for the second time in step S230. FIG. 16 illustrates an example of the movement route when the first print mode is selected.

FIG. 16 is a diagram illustrating the movement route when the first print mode is selected. FIG. 16 illustrates a movement route RU1a of the printing operation for the first time and a movement route RU2a of the printing operation for the second time indicated by the route information DaA when an XYZ space is viewed from the Z2 direction. In FIG. 16, in order to easily understand a positional relationship between the movement route RU1a and the movement route RU2a, the surface WF to be printed and the base portion 210 of the robot 200A are displayed.

As illustrated in FIG. 16, in the first print mode, a printing start position PS1a of the movement route RU1a is closer to the base portion 210 than a printing end position PE1a, and a printing start position PS2a of the movement route RU2a is closer to the base portion 210 than a printing end position PE2a.

The description is returned to FIG. 15. After the processing of step S230 is ended, the computer 700A supplies the route information DaA to the controller 600A. The controller 600A stores the supplied route information DaA in the storage circuit 610A. After the route information DaA is stored in the storage circuit 610A, in step S240, the controller 600A causes the robot 200A to execute the non-printing operation. The non-printing operation of step S240 is an operation in which the robot 200A changes the relative position of the head 310 with respect to the workpiece W before the first printing operation for the first time. In the non-printing operation, the head 310 does not discharge the ink. The non-printing operation includes, for example, a preparation operation such as an operation in which the robot 200A moves the head 310 to the printing start position PS1a of the first printing operation for the first time and the rotation axis O2, the rotation axis O3, and the rotation axis O5 are parallel to each other. In the non-printing operation, all of the six joints 230 of the robot 200A can be moved, and the head 310 is moved by the movement of a larger number of joints 230 than in the first printing operation.

After the processing of step S240 is ended, in step S250, the controller 600A causes the robot 200A to execute the first printing operation for the first time based on the route information DaA. After the processing of step S250 is ended, in step S260, the controller 600A executes the non-printing operation. The non-printing operation of step S260 is an operation in which the robot 200A changes the relative position of the head 310 with respect to the workpiece W after the first printing operation for the first time and before the first printing operation for the second time. The non-printing operation includes a preparation operation such as an operation in which the robot 200A moves the head 310 from the printing end position PE1a to the printing start position PS2a of the first printing operation for the second time and the rotation axis O2, the rotation axis O3, and the rotation axis O5 are parallel to each other. In the non-printing operation, all of the six joints 230 of the robot 200A can be moved, and the head 310 is moved by the movement of a larger number of joints 230 than in the first printing operation.

After the processing of step S260 is ended, in step S270, the controller 600A causes the robot 200A to execute the first printing operation for the second time based on the route information DaA. After the processing of step S270 is ended, in step S280, the controller 600A executes the non-printing operation. The non-printing operation of step S280 is an operation in which the robot 200A changes the relative position of the head 310 with respect to the workpiece W after the first printing operation for the second time. In the non-printing operation, the head 310 does not discharge the ink. The non-printing operation includes, for example, an operation in which the robot 200A moves the head 310 from the printing end position PE2a to another position. In the non-printing operation, all of the six joints 230 of the robot 200A can be moved, and the head 310 is moved by the movement of a larger number of joints 230 than in the first printing operation. After the processing of step S280 is ended, the three-dimensional object printing apparatus 100A ends the series of processing illustrated in FIG. 15. The operation illustrated in FIG. 15 is executed by the computer 700A controlling the robot 200A and the liquid discharge unit 300 via the controller 600A and the control module 500.

Figure 17:
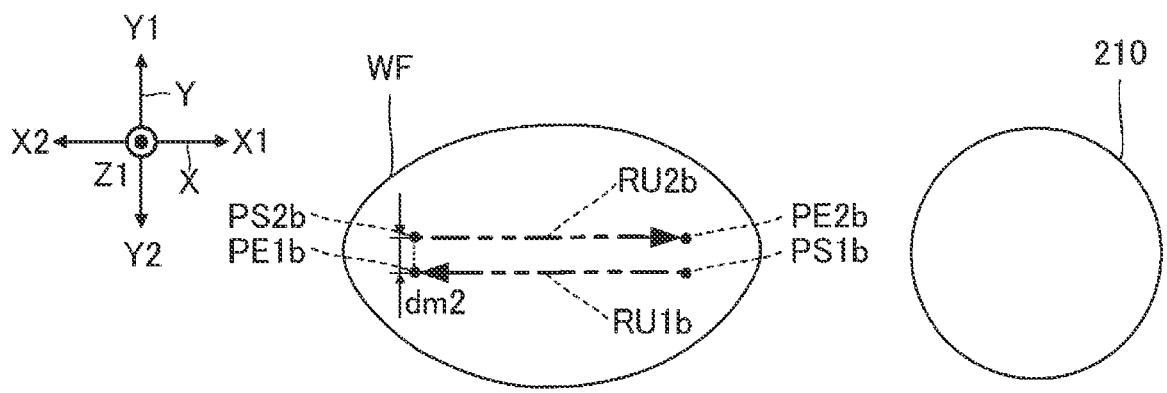
FIG. 17 is a diagram illustrating a movement route when a second print mode is selected.

When the determination result in step S220 is negative, that is, when the second print mode is selected, the computer 700A generates the route information DaA indicating the movement route on which the head 310 moves away from the base portion 210 in the printing operation for the first time in step S310 and indicating the movement route on which the head 310 moves to approach the base portion 210 in the printing operation for the second time. FIG. 17 illustrates an example of the movement route when the second print mode is selected.

FIG. 17 is a diagram illustrating the movement route when the second print mode is selected. FIG. 17 illustrates a movement route RU1b of the printing operation for the first time and a movement route RU2b of the printing operation for the second time indicated by the route information DaA when the XYZ space is viewed from the Z2 direction. In FIG. 17, in order to easily understand a positional relationship between the movement route RU1b and the movement route RU2b, the surface WF to be printed and the base portion 210 of the robot 200A are displayed.

As illustrated in FIG. 17, in the second print mode, a printing start position PS1b of the movement route RU1b is closer to the base portion 210 than a printing end position PE1b, and a printing start position PS2b of the movement route RU2b is farther from the base portion 210 than a printing end position PE2b.

As illustrated in FIGS. 16 and 17, the movement route RU1a when the first print mode is selected and the movement route RU1b when the second print mode is selected are the same. On the other hand, the movement route RU2a when the first print mode is selected and the movement route RU2b when the second print mode is selected are different from each other. More specifically, the printing start position PS2a of the movement route RU2a coincides with the printing end position PE2b of the movement route RU2b, and the printing end position PE2a of the movement route RU2a coincides with the printing start position PS2b of the movement route RU2b. A locus of the head 310 according to the movement route RU2a and a locus of the head 310 according to the movement route RU2b are substantially the same.

The description is returned to FIG. 15. After the processing of step S310 is ended, the computer 700A supplies the route information DaA to the controller 600A. The controller 600A stores the supplied route information DaA in the storage circuit 610A. After the route information DaA is stored in the storage circuit 610A, in step S320, the controller 600A causes the robot 200A to execute the non-printing operation. The non-printing operation of step S320 is an operation in which the robot 200A changes the relative position of the head 310 with respect to the workpiece W before the first printing operation. In the non-printing operation, the head 310 does not discharge the ink. The non-printing operation includes, for example, a preparation operation such as an operation in which the robot 200A moves the head 310 to the printing start position PS1b of the first printing operation and the rotation axis O2, the rotation axis O3, and the rotation axis O5 are parallel to each other. In the non-printing operation, all of the six joints 230 of the robot 200A can be moved, and the head 310 is moved by the movement of a larger number of joints 230 than in the first printing operation.

After the processing of step S320 is ended, in step S330, the controller 600A causes the robot 200A to execute the first printing operation based on the route information DaA. After the processing of step S330 is ended, in step S340, the controller 600A executes the non-printing operation. The non-printing operation of step S340 is an operation in which the robot 200A changes the relative position of the head 310 with respect to the workpiece W after the first printing operation and before the second printing operation. The non-printing operation includes a preparation operation such as an operation in which the robot 200A moves the head 310 from the printing end position PE1b to the printing start position PS2b of the second printing operation and the rotation axis O2, the rotation axis O3, and the rotation axis O5 are parallel to each other. In the non-printing operation, all of the six joints 230 of the robot 200A can be moved, and the head 310 is moved by the movement of a larger number of joints 230 than in the first printing operation.

As illustrated in FIGS. 16 and 17, a distance dm2 from the printing end position PE1b to the printing start position PS2b is less than a distance dm1 from the printing end position PE1a to the printing start position PS2a. Accordingly, it can be said that a moving distance of the head 310 in the non-printing operation of step S340 is less than a moving distance of the head 310 in the non-printing operation of step S260. Since a period required for the movement of the head 310 is shortened, a period required for the non-printing operation of step S340 is less than a period required for the non-printing operation of step S260.

After the processing of step S340 is ended, in step S350, the controller 600A causes the robot 200A to execute the second printing operation based on the route information DaA. The first angle $\theta_1$ at the start of the second printing operation may be less than or equal to 140 degrees. The first angle $\theta_1$ at the start of the acceleration operation included in the non-printing operation executed before the second printing operation may be less than or equal to 140 degrees.

Similarly to the first printing operation, in the second printing operation, the three-dimensional object printing apparatus 100A sets the rotation axis O2, the rotation axis O3, and the rotation axis O5 to be parallel to each other. However, the present disclosure is not limited thereto, and for example, the rotation axis O2, the rotation axis O3, and the rotation axis O6 may be parallel to each other. The second printing operation may be executed in a state where the rotation axis O2, the rotation axis O3, and the rotation axis O5 are not parallel to each other.

After the processing of step S350 is ended, in step S360, the controller 600A executes the non-printing operation. The non-printing operation of step S360 is an operation in which the robot 200A changes the relative position of the head 310 with respect to the workpiece W after the second printing operation. In the non-printing operation, the head 310 does not discharge the ink. The non-printing operation includes, for example, an operation in which the robot 200A moves the head 310 from the printing end position PE2b to another position. In the non-printing operation, all of the six joints 230 of the robot 200A can be moved, and the head 310 is moved by the movement of a larger number of joints 230 than in the second printing operation. After the processing of step S360 is ended, the three-dimensional object printing apparatus 100A ends the series of processing illustrated in FIG. 15.

2.3. Summary of Second Embodiment

As described above, when the three-dimensional object printing apparatus 100A according to the second embodiment executes the printing operation in which the robot 200A moves the position of the head 310 multiple times while the ink is discharged from the head 310, the first print mode and the second print mode are selectable. The three-dimensional object printing apparatus 100A executes the first printing operation multiple times and does not execute the second printing operation when the first print mode is selected, and executes the first printing operation once or multiple times and executes the second printing operation once or multiple times when the second print mode is selected. The second printing operation is an operation in which the robot 200A moves the position of the head 310 while the ink is discharged from the head 310, and the head 310 moves to approach the base portion 210 during the execution of the second printing operation. In the first print mode, in multiple printing operations, since the head 310 moves only in a direction in which the head 310 is away from the base portion 210, a period required to complete the multiple printing operations is longer than in the second print mode. However, since the vibration caused in the joint 230 can be suppressed, the printing quality can be improved. On the other hand, in the second print mode, the head 310 moves in either the direction in which the head 310 is away from the base portion 210 or the direction in which the head 310 approaches to the base portion 210. Accordingly, in the second print mode, the printing quality deteriorates due to the vibration caused in the joint 230 in the direction in which the head 310 approaches the base portion 210 as compared with the first print mode. However, the period required to complete the multiple printing operations can be shortened.

The first angle $\theta_1$ at the start of the second printing operation may be less than or equal to 140 degrees. The first angle $\theta_1$ at the start of the second printing operation is less than or equal to 140 degrees. Thus, when the moving speed of the head 310 on the X-axis is constant, the rotation speed of the joint 230_3 is also constant to some extent. Accordingly, the vibration caused in the joint 230_3 can be suppressed, and the printing quality can be improved.

The first angle $\theta_{1S}$ at the start of the acceleration operation included in the non-printing operation executed before the second printing operation may be less than or equal to 140 degrees. This is because when the first angle $\theta_{1S}$ at the start of this acceleration operation is greater than 140 degrees, the vibration caused in the joint 230_3 increases, the vibration also remains in the second printing operation after the end of the acceleration operation, and the printing quality deteriorates.

As in the first embodiment, the first angle $\theta_1$ at the start of the first printing operation may be less than or equal to 140 degrees.

In the second embodiment, although the example in which the number of times of the printing operation is executed twice is described, the number of times the printing operation is executed may be greater than twice. When the number of times the printing operation is executed is n, for example, the three-dimensional object printing apparatus 100A may execute alternately the first printing operations and the second printing operations such that an odd-numbered printing operation that does not exceed n is executed as the first printing operation and an even-numbered printing operation that does not exceed n is executed as the second printing operation. The present disclosure is not limited to the aspect in which the first printing operations and the second printing operations are alternately executed. For example, after the first printing operation is executed multiple times, the second printing operation may be executed once, and the first printing operation may be executed multiple times.

3. Modification Examples

Each of the above-exemplified forms can be variously modified. Specific modification aspects are exemplified below. Two or more aspects randomly selected from the following examples can be appropriately merged without contradicting each other.

3-1. First Modification Example

In the first embodiment, although the head 310 moves away from the base portion 210, the present disclosure is not limited thereto. At the start of the printing operation, the head 310 may move to approach the base portion 210 in a state where the arm 220 is fully extended or in a state where the arm is almost fully extended. That is, as described in the first embodiment, a state where the first angle $\theta_1$ at a point in time of the start of the printing operation is greater than 140 degrees may be avoided from the viewpoint of suppressing the vibration of the arm 220. A state where the first angle $\theta_1$ is greater than 140 degrees may be further avoided even during the printing operation.

In the first modification example, the first angle $\theta_1$ at a point in time at which the head 310 starts discharging the ink in the printing operation, that is, at a point in time of the start of the printing operation is less than or equal to 140 degrees. The first angle $\theta_{1S}$ at the start of the acceleration operation included in the non-printing operation executed before the printing operation may be less than or equal to 140 degrees.

The first angle $\theta_1$ at a point in time of the start of the printing operation may be less than or equal to 120 degrees. The first angle $\theta_1$ at a point in time of the start of the printing operation may be less than or equal to 100 degrees.

In the printing operation according to the first modification example, the head 310 may move to be away from the base portion 210, or the head 310 may move to approach the base portion 210.

As described above, a three-dimensional object printing apparatus 100 according to the first modification example includes a head 310 that discharges ink to a three-dimensional workpiece W, and a robot 200 that changes relative positions of the workpiece W and the head 310. The robot 200 includes an arm 220 and a base portion 210 coupled to one end of the arm 220. The arm 220 has an arm component 226 which is the other end of the arm 220 and a tip portion which supports the head 310, and a plurality of joints 230. The three-dimensional object printing apparatus 100 according to the first modification example executes a printing operation in which the robot 200 moves a position of the head 310 while the ink is discharged from the head 310. The plurality of joints 230 include a joint 230_3, a joint 230_2, and a joint 230_5. The joint 230_2 is closer to the base portion 210 than the joint 230_3, the joint 230_5 is closer to the arm component 226 than the joint 230_3, the joint 230_3 rotates around a rotation axis O3, the joint 230_2 rotates around a rotation axis O2, and the joint 230_5 rotates around a rotation axis O5. The robot 200 can set the rotation axis O3, the rotation axis O2, and the rotation axis O5 to be parallel to each other. When a line segment connecting the joint 230_2 and the joint 230_3 is a first virtual line segment L1, a line segment connecting the joint 230_3 and the joint 230_5 is a second virtual line segment L2, and an angle formed by the first virtual line segment L1 and the second virtual line segment L2 is a first angle $\theta_1$, the first angle $\theta_1$ at a point in time at which the head 310 starts discharging the ink in the printing operation is less than or equal to 140 degrees. As illustrated in FIG. 11, an inclination of a first angular characteristic C$\theta_1$ in a range where the first angle $\theta_1$ is from 140 degrees to 180 degrees is greater than an inclination of the first angular characteristic C$\theta_1$ in a range where the first angle $\theta_1$ is from 0 degrees to 140 degrees. Accordingly, according to the first modification example, since the vibration caused in the joint 230_3 can be reduced as compared with the aspect in which the first angle $\theta_1$ at a point in time of the start of the printing operation is greater than 140 degrees, the printing quality can be improved.

As in the first modification example, a rotation amount of the joint 230_3 during the execution of the printing operation is greater than a rotation amount of the joint 230_2, as in the first embodiment. Thus, the joint 230_3 is easier to vibrate than the joint 230_2 during the execution of the printing operation. Accordingly, when the vibration of the joint 230_3 is suppressed in the printing operation by moving the head 310 such that the first angle $\theta_1$ at a point in time of the start of the printing operation is less than or equal to 140 degrees, the printing quality can be effectively improved.

In the printing operation, the first angle $\theta_1$ at a point in time at which the head 310 starts discharging the ink may be less than or equal to 120 degrees. As illustrated in FIG. 11, in the aspect in which the first angle $\theta_1$ at a point in time of the start of the printing operation is less than or equal to 120 degrees, since the inclination of the first angular characteristic C$\theta_1$ is small and the vibration caused in the joint 230_3 can be reduced as compared to the aspect in which the first angle $\theta_1$ at a point in time of the start of the first printing operation is greater than 120 degrees, the printing quality can be improved.

In the printing operation, the first angle $\theta_1$ at a point in time at which the head 310 starts discharging the ink may be less than or equal to 100 degrees. As illustrated in FIG. 11, in the aspect in which the first angle $\theta_1$ at a point in time of the start of the printing operation is less than or equal to 100 degrees, since the vibration caused in the joint 230_3 can be reduced as compared to the aspect in which the first angle $\theta_1$ at a point in time of the start of the first printing operation is greater than 100 degrees, the printing quality can be improved.

As in the first embodiment, the plurality of joints include a joint 230_1 provided between the joint 230_3 and the base portion 210, and the joint 230_1 rotates around the rotation axis O1 and the rotation axis O2 and the rotation axis O1 are perpendicular to each other.

3-2. Second Modification Example

In the above-described form, although the configuration in which the three joints 230 are moved during the execution of the printing operation is exemplified, the present disclosure is not limited thereto, and a configuration in which four or more joints 230 are moved during the execution of the printing operation may be used. The rotation axes of the three joints 230 are not limited to the case where the rotation axes are orthogonal to the Z-axis, and are orthogonal to any axis.

3-3. Third Modification Example

In above-described form, although the configuration using the 6-axis vertical articulated robot as the robot 200 is exemplified, the present disclosure is not limited to this configuration. The robot 200 may be, for example, a vertical articulated robot other than the 6-axis robot, or may be a horizontal articulated robot. A robot having an expansion and contraction mechanism in addition to the rotation joint may be used. However, the robot may be a multi-axis robot having 6 or more axes from the viewpoint of balance between the printing quality in the printing operation and a degree of freedom of the operation of the robot in the non-printing operation. Although the robot 200 according to the first embodiment has only the rotation joint, the robot 200 may have a linear motion joint in addition to the rotation joint.

3-4. Fourth Modification Example

In above-described form, although the configuration using screwing or the like as a method for fixing the liquid discharge head to the tip portion of the arm 220 is exemplified, the present disclosure is not limited to this configuration. For example, the liquid discharge head may be fixed to the tip portion of the arm 220 by gripping the liquid discharge head by a gripping mechanism such as a hand attached to the tip portion of the arm 220.

3-5. Fifth Modification Example

In above-described form, although the configuration in which printing is performed by using one type of ink is exemplified, the present disclosure is not limited to this configuration, and is applicable to a configuration in which printing is performed by using two or more types of ink.

What is claimed is:

1. A three-dimensional object printing apparatus comprising:
   a head that discharges a liquid to a three-dimensional workpiece;
   a robot that includes an arm and a base portion coupled to one end of the arm, and changes relative positions of the workpiece and the head; and
   a controller that controls driving of the robot, wherein
   the arm includes six joints and a tip portion that is the other end of the arm and supports the head,
   the three-dimensional object printing apparatus executes a first printing operation in which the robot moves the head away from the base portion along a main printing direction, along which the liquid is discharged from the head, while the arm extends away from the base portion in a direction along the main printing direction, and
   the controller moves three joints among the six joints of the arm of the robot, the three joints having axes parallel to the main printing direction in the first printing operation.

2. The three-dimensional object printing apparatus according to claim 1, wherein
   the arm includes
   a first arm component, and
   a second arm component that is coupled to the first arm component and is provided closer to the base portion than the first arm component,
   the six joints include a first joint that couples the first arm component and the second arm component, and
   the head moves such that an angle formed by the first arm component and the second arm component increases during the execution of the first printing operation.

3. The three-dimensional object printing apparatus according to claim 1, wherein
   the six joints include a first joint, a second joint, and a third joint,
   the second joint is closer to the base portion than the first joint,
   the third joint is closer to the tip portion than the first joint,
   the first joint rotates around a first rotation axis,
   the second joint rotates around a second rotation axis,
   the third joint rotates around a third rotation axis,
   the robot is configured to set the first rotation axis, the second rotation axis, and the third rotation axis to be parallel to each other, and
   when a line segment coupling the second joint and the first joint is a first virtual line segment, a line segment coupling the first joint and the third joint is a second virtual line segment, and an angle formed by the first virtual line segment and the second virtual line segment is a first angle, the head moves such that the first angle increases during the execution of the first printing operation.

4. The three-dimensional object printing apparatus according to claim 3, wherein
   in the first printing operation, a rotation amount of the first joint is greater than a rotation amount of the second joint.

5. The three-dimensional object printing apparatus according to claim 3, wherein
   the plurality of joints include a fourth joint provided between the second joint and the base portion,
   the fourth joint rotates around a fourth rotation axis, and
   when a line segment connecting the second joint and the fourth joint is a third virtual line segment and an angle formed by the first virtual line segment and the third virtual line segment is a second angle, the head moves such that the second angle decreases during the execution of the first printing operation.

6. The three-dimensional object printing apparatus according to claim 3, wherein
   the plurality of joints include a fourth joint provided between the second joint and the base portion,
   the fourth joint rotates around a fourth rotation axis, and
   the second rotation axis and the fourth rotation axis are perpendicular to each other.

7. The three-dimensional object printing apparatus according to claim 3, wherein
   when the three-dimensional object printing apparatus executes a printing operation in which the robot moves the position of the head while the liquid is discharged from the head multiple times, a first print mode and a second print mode is selectable,
   when the first print mode is selected, the three-dimensional object printing apparatus executes the first printing operation multiple times, and the three-dimensional object printing apparatus does not execute a second printing operation,
   when the second print mode is selected, the three-dimensional object printing apparatus executes the first printing operation once or multiple times, and the three-dimensional object printing apparatus executes the second printing operation once or multiple times,
   the second printing operation is an operation in which the robot moves the position of the head while the liquid is discharged from the head, and
   the head moves to approach the base portion during the execution of the second printing operation.

8. The three-dimensional object printing apparatus according to claim 7, wherein
   the first angle at a start of the second printing operation is less than or equal to 140 degrees.

9. The three-dimensional object printing apparatus according to claim 3, wherein
   the first angle at a start of the first printing operation is less than or equal to 140 degrees.

10. The three-dimensional object printing apparatus according to claim 1, wherein in the first printing operation, the robot moves the head by following a linear movement direction starting from a closest position from the base portion to a farthest position from the base portion along the main printing direction.

11. The three-dimensional object printing apparatus according to claim 1, wherein
the three-dimensional object printing apparatus executes a non-printing operation in which the controller moves the six joints of the arm of the robot before executing the first printing operation.

12. A three-dimensional object printing apparatus comprising:
a head that discharges a liquid to a three-dimensional workpiece;
a robot that includes an arm and a base portion coupled to one end of the arm, and changes relative positions of the workpiece and the head; and
a controller that controls driving of the robot, wherein
the arm includes six joints and a tip portion that is the other end of the arm and supports the head,
the three-dimensional object printing apparatus executes a first printing operation in which the robot moves a position of the head in a direction from a first position to a second position along a main printing direction while the liquid is discharged from the head,
the head moves away from the first position, which is the closest position from the base portion in the main printing direction to the second position, which is the farthest position from the base portion in the main printing direction,
a direction in which the arm extend during the first printing operation is parallel with the main printing direction, and
the controller moves three joints among the six joints of the arm of the robot, the three joints having axes parallel to the main printing direction in the first printing operation.

* * * * *